US007788783B2

(12) United States Patent
Neidich

(10) Patent No.: US 7,788,783 B2
(45) Date of Patent: Sep. 7, 2010

(54) METHOD OF MANUFACTURING WALK-IN TUBS

(75) Inventor: Andre J. Neidich, Boca Raton, FL (US)

(73) Assignee: Safety Tubs, LLC, Bacon Raton, FL (US)

( * ) Notice: Subject to any disclaimer, the term of this patent is extended or adjusted under 35 U.S.C. 154(b) by 993 days.

(21) Appl. No.: 11/551,160

(22) Filed: Oct. 19, 2006

(65) Prior Publication Data

US 2008/0092361 A1   Apr. 24, 2008

(51) Int. Cl.
B23P 11/02 (2006.01)
B29C 51/00 (2006.01)
A47K 3/02 (2006.01)

(52) U.S. Cl. ............... 29/447; 29/446; 29/434; 4/555; 264/522; 264/547; 264/553

(58) Field of Classification Search .......... 29/434, 29/446, 447; 4/556, 555, 540; 49/381; 264/553, 264/547, 522

See application file for complete search history.

(56) References Cited

U.S. PATENT DOCUMENTS

| 3,066,316 | A | * | 12/1962 | Russell | 4/556 |
| 3,371,354 | A | * | 3/1968 | Hayslett | 4/556 |
| 3,582,388 | A | * | 6/1971 | Stayner | 428/325 |
| 3,863,275 | A | * | 2/1975 | Brendgord et al. | 4/556 |
| 4,080,710 | A | * | 3/1978 | Hess | 29/416 |
| 4,158,585 | A | * | 6/1979 | Wright | 156/94 |
| 5,074,770 | A | * | 12/1991 | Graefe | 425/117 |
| 5,129,804 | A | * | 7/1992 | Perantoni et al. | 425/117 |
| 5,184,358 | A | * | 2/1993 | Gruidel et al. | 4/555 |
| 5,351,345 | A | * | 10/1994 | Sills et al. | 4/555 |
| 5,676,901 | A | * | 10/1997 | Higashi et al. | 264/255 |
| 5,701,614 | A | * | 12/1997 | Appleford et al. | 4/555 |
| 5,813,062 | A | * | 9/1998 | Vago et al. | 4/556 |
| 6,113,839 | A | * | 9/2000 | McAllister | 264/512 |
| 7,237,276 | B2 | * | 7/2007 | Longman | 4/555 |
| 7,299,509 | B1 | * | 11/2007 | Neidich | 4/556 |
| 2008/0040849 | A1 | * | 2/2008 | Brandenstein | 4/580 |
| 2008/0109954 | A1 | * | 5/2008 | Neidich | 4/556 |
| 2010/0037382 | A1 | * | 2/2010 | Spiker et al. | 4/556 |

FOREIGN PATENT DOCUMENTS

| JP | 06198660 A | * | 7/1994 |
| JP | 2002067137 A | * | 3/2002 |
| JP | 2008062501 A | * | 3/2008 |

* cited by examiner

*Primary Examiner*—Essama Omgba
(74) *Attorney, Agent, or Firm*—Carstens & Cahoon LLP

(57) ABSTRACT

The present invention provides a method for manufacturing a walk-in bathtub. The method involves heating an acrylic sheet, wherein the outer perimeter of the sheet is heated to a higher temperature than the center of the sheet. The heated acrylic sheet is then placed over a vacuum mold that is shaped like a bathtub, including a seat and a foot well, and drawn into the mold by the vacuum. Vacuum pressure is manually reduced when the acrylic reaches the top of the seat in the mold, and the vacuum is shut off when the acrylic is approximately two inches from the bottom of the foot well of the mold. The acrylic is removed from the mold, reinforced with fiberglass and secured to a support frame. A door space is cut in the side of the tub and a pre-hung door assembly is then installed in the door threshold.

17 Claims, 24 Drawing Sheets

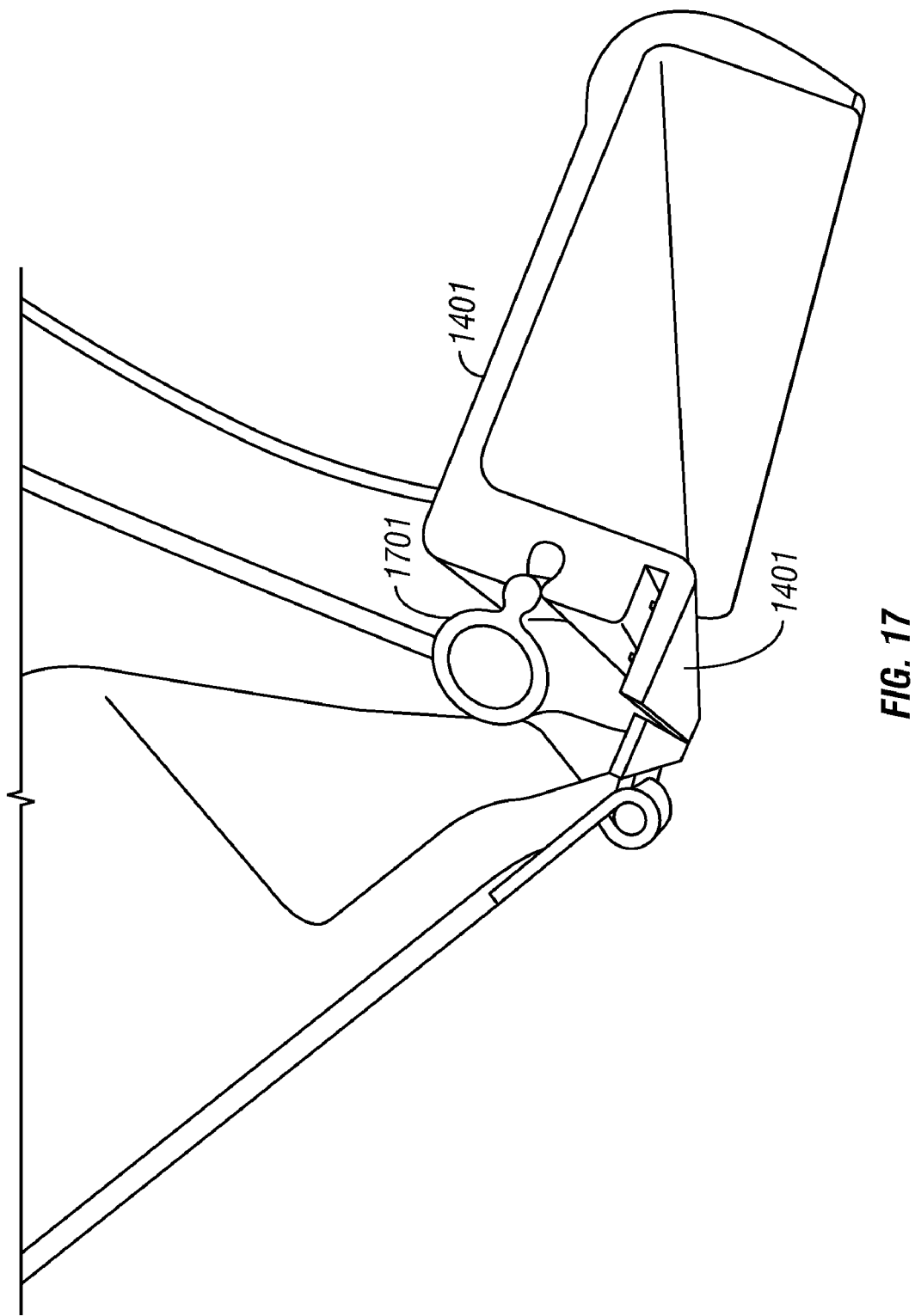

TOP VIEW

TOP VIEW

TOP VIEW

METHOD OF MANUFACTURING WALK-IN TUBS

TECHNICAL FIELD

The present invention relates generally to the manufacture of walk-in bathtubs and more specifically to a method for manufacturing a walk-in tub from acrylic.

BACKGROUND OF THE INVENTION

Walk-in bathtubs comprise high tub walls with a high built in seat and a side door, allowing the user to walk into the tub from the side and sit down without having to climb down into a low bath tub. FIG. 1 shows a typical example of a walk-in bathtub in accordance with the prior art. Walk-in tubs are particularly suited for individuals who have physical limitations that make it difficult or dangerous to climb into and out of a regular, low bathtub or to stand up in a shower for extended periods of time. Such limitations might include physical disabilities or simply the reduced strength, balance and range of motion that typically occur with advancing age. Walk-in tubs are not only easier to enter and exit than conventional bathtubs, they also reduce the chances of slips and falls compared to conventional tubs and showers.

In addition to safety, the ease of entering the tub via the side walk-in door also provides users with independence, allowing them to bathe without the assistance of another person when getting into and out of the tub.

Acrylic is the preferred material for conventional bathtub manufacturers. Acrylic is germ and stain resistant, has good heat retaining qualities and is durable. Because acrylic is non-porous, mildew and algae cannot stick to it. It wipes clean with common household non-abrasive cleaners. Even grease, oils, hair dyes and cosmetics that would stain other materials can be easily removed with rubbing alcohol.

However, because of their depth, walk-in bathtubs are typically made from gel-coated fiberglass, which does not offer the advantages of acrylic in terms of heat retention, stain resistance and strength. The reason for using fiberglass in manufacturing walk-in tubs lies in the technical difficulties in forming the deep basin of the tub with a single sheet of acrylic. With seat heights approaching 17 inches above the tub floor, acrylic has a tendency to tear during the vacuum forming process or become excessively thin at the bottom, comprising its ability to hold the requisite water weight.

Therefore, a need exists for a method of vacuuming forming walk-in bathtubs from a single sheet of acrylic.

SUMMARY OF THE INVENTION

The present invention provides a method for manufacturing and assembling an acrylic walk-in bathtub. The method involves heating an acrylic sheet, wherein the outer perimeter of the sheet is heated to a higher temperature (370° F.) than the center of the sheet (310-312° F.). The heated acrylic sheet is then placed over a vacuum mold, wherein the mold is shaped like a bathtub, including a seat and a foot well. The vacuum draws the heated acrylic sheet into the mold. Vacuum pressure is manually reduced when the acrylic reaches the top of the seat in the mold, and the vacuum is shut off when the acrylic is approximately two inches from the bottom of the foot well of the mold. In the preferred embodiment, the corner between the floor and the side walls of the foot well has a radius of three inches to avoid sharp angles that may tear the acrylic during the vacuum forming process. A mold release agent may also be sprayed onto the mold to facilitate the movement of the acrylic over the surface of the mold.

The acrylic is cooled and removed from the mold and reinforced with fiberglass. The tub is then secured to a support frame. A door space is cut in the side of the molded acrylic tub to allow a person to step into the foot well of the tub from the side without having to step over the walls of the tub.

In the preferred embodiment, an acrylic apron is attached to the side of the frame. The apron has a cut out door threshold approximately two and a half inches deep to fill the gap between the apron and the door cut-out in the side of the tub. A pre-hung door assembly is then installed in the door threshold.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 17 shows a gasket into the designated track of the frame in accordance with the preferred embodiment of the present invention;

DETAILED DESCRIPTION

Figure 1:
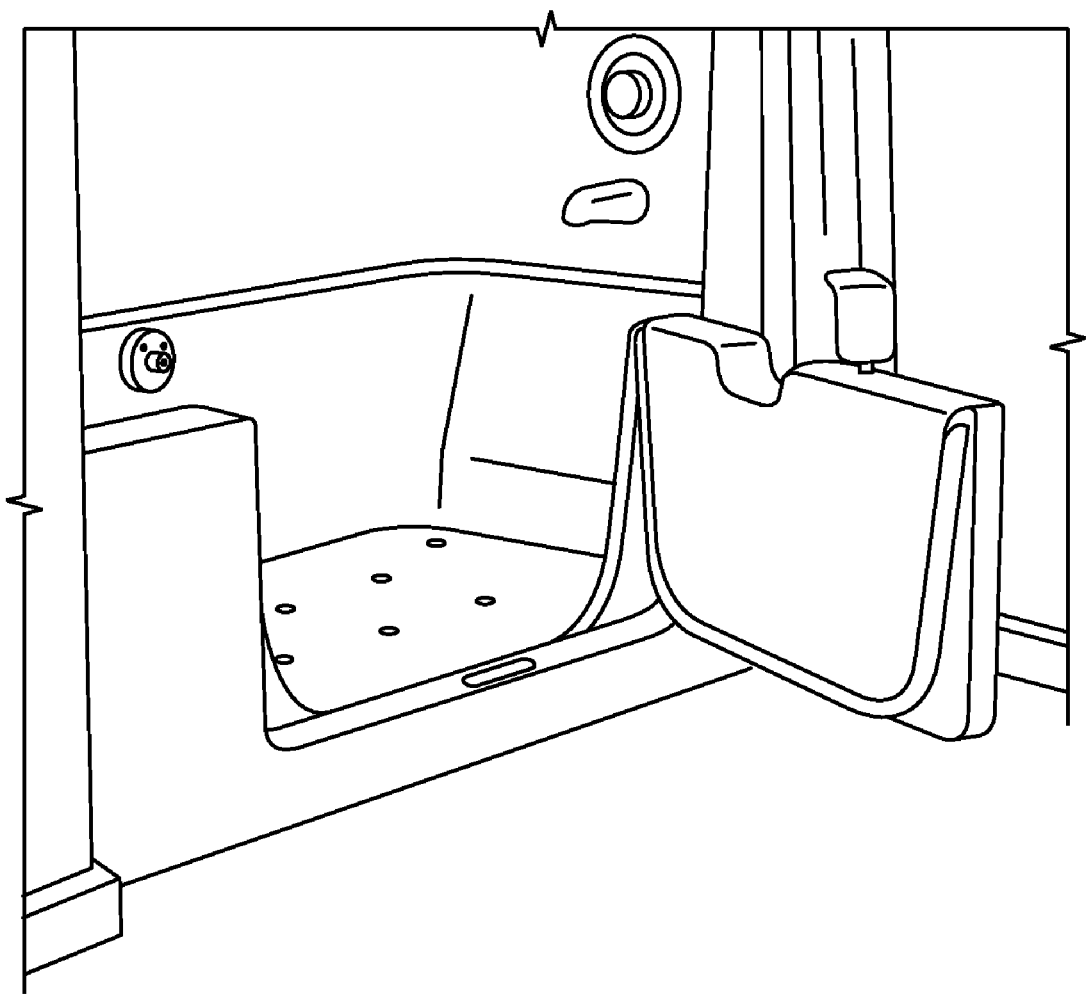
FIG. 1 shows a typical example of a walk-in bathtub in accordance with the prior art.

Acrylic sheet is commonly manufactured by one of three techniques. Each technique offers unique benefits, from cost and physical properties to variety of color and finish. Depending on the fabricator's needs, one type may be more appropriate than another. Understanding the manufacturing processes and differences between the end products is instrumental in choosing the proper material for a given application.

Extrusion is a continuous production method of manufacturing acrylic sheet. In the extrusion process, pellets of resins are fed into an extruder which heats them until they are a molten mass. This mass is then forced through a die as a molten sheet, which is then fed to calender rolls, the spacing of which determine the thickness of the sheet and in some cases the surface finish. The continuous band of sheet may then be cut or trimmed into its final size.

The final product of extrusion exhibits much closer thickness tolerances than cast sheet. Because of the volume at which extruded sheet is produced, it is generally the most economical form available. It is available in a fair selection of colors, finishes and sizes.

Extruded acrylic sheet is prone to shrinking along the extruded line and expansion across it. This is of particular note if the acrylic is used for thermoforming. Extruded material also has a tendency to gum during fabrication if the cutting is too fast (linear feed rate) because it has a lower molecular weight. It also may absorb fast drying solvent cements faster than cast or continuous cast material. This can result in joint failures and incomplete gluing. To remedy this, slower drying cements and tooling designed for cutting extruded acrylic are generally used.

Continuous casting is an alternative method of mass producing acrylic sheet. This process involves pouring partially polymerized acrylic (somewhat less viscous than "Karo" syrup) between two highly polished stainless steel belts. The belts are separated by a space equal to the thickness of the sheet and the syrup is retained by gaskets at the edge of the belts. The belts move through a series of cooling and heating units to regulate the curing and are cut on the fly to size at the end of the production line.

One advantage of this process is partial polymerization of the material prior to casting. Some of the heat of polymerization (heat which is evolved as the liquid monomer is converted to a solid resin) is removed before the "syrup" is fed to the belt system. This contributes to the control of the continuous process.

Material costs favor continuous casting over extruded sheet manufacturing, as the cost of monomer is much less than that of polymer pellets. However, the production cost per unit of product is less for extrusion. Which process is more economical depends on the capacity and utility of the facilities as well as the cost of materials and equipment. In terms of competitive pricing between continuous cast and extruded acrylic, there are approximately a dozen extruders of acrylic sheet and only two continuous cast manufacturers in the U.S. This will have obvious effects on competitive pricing.

Continuous Cast acrylic offers good optical clarity, more uniform thickness and limited shrinkage during thermoforming.

A third method of manufacturing acrylic sheet is called cell casting. Cell casting historically has been carried out using one of three processes. The first process is the water bath technique in which acrylic syrup is poured into a mold typically constructed from two tempered glass sheets separated to produce the desired thickness of the sheet and sealed with a gasket at the edge. The mold is then submerged in a bath which maintains/controls a curing temperature and efficiently removes the heat generated in the process when the monomer is converted to polymer. (Note: Monomer is not used in cell casting.) The viscosity of acrylic monomer must be raised somewhat to avoid leakage of the molds or cells.

The second casting technique is the original process which involves placing the molds containing a syrup into a circulating air oven in which air at a controlled temperature passes at a moderately high velocity over the surface of the mold.

The third method, developed by the Polycast Company, is an advancement over the water bath process was and involves the use of a piece of equipment similar to a plate and frame filter press. Sections which serve as the mold for the sheet are alternated with sections through which water at a regulated temperature is circulated to promote the polymerization and cure of the sheet.

Cell cast products are subjected to a post-cure or annealing process. The sheet, as taken from the oven, bath or casting machine, will usually have "high" residual monomer content. The polymerization process is not complete. Post-curing reduces the residual monomer content and serves to insure that no bubbling of the sheet occurs if the sheet is heated for thermoforming.

When casting a sheet from syrup a change in density (specific gravity) of the ingredients occurs. Shrinkage of about 20% is typically experienced. In the cell casting process most shrinkage occurs in thickness. The surface of the mold (tempered glass sheet) restrains the plastic sheet from shrinkage in terms of length and width. The annealing, in which the sheet is heated to its softening point, allows the sheet to relax or shrink, removing residual stress.

Cell cast products provide optical clarity, greater surface hardness and machine cleanly. They are offered in many colors, finishes and thicknesses. However, they do have greater thickness variation, making them less desirable for fitting into extrusions or thermoforming where uniform wall thickness must be maintained.

The preferred embodiment of the present invention utilizes continuous casting. However, any of the acrylic sheet manufacturing methods described above can be used with the present invention.

Thermoforming (or vacuum forming) is a process in which a flat thermoplastic sheet is heated and deformed into the desired shape. The process is widely used in packaging consumer products and fabricating large items such as bathtubs, contoured skylights, and internal door liners for refrigerators.

As the name implies, thermoforming comprises two main steps: 1) heating and 2) forming. Heating is usually accomplished by radiant electric heaters, located on one or both sides of the starting plastic sheet at a distance of roughly 125 mm (5 in.). The duration of the heating cycle needed to sufficiently soften the sheet depends on the polymer, its thickness and color.

Figure 2A:
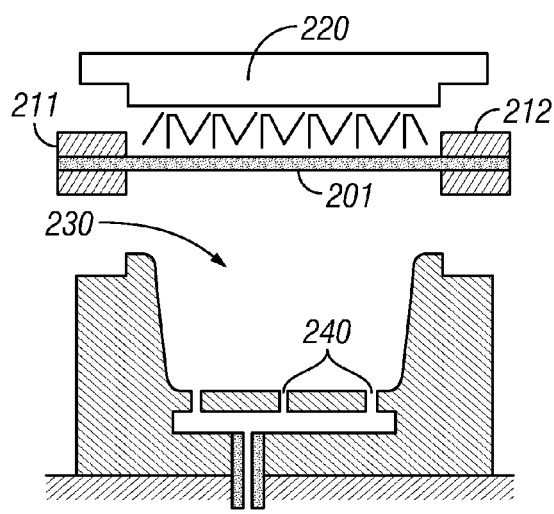
FIGS. 2A-2D illustrate the general process of vacuum thermoforming which may be used with the present invention.

FIGS. 2A-2D illustrate the general process of vacuum thermoforming which may be used with the present invention. Developed in the 1950's, vacuum thermoforming (also called vacuum forming) uses negative pressure to draw a preheated sheet into a mold cavity. FIG. 2A illustrates the first step, in which a flat acrylic sheet is softened by heating. The sheet 201, held by clamps 211,212 is placed in close proximity to a radiant heather 220.

Figure 2B:
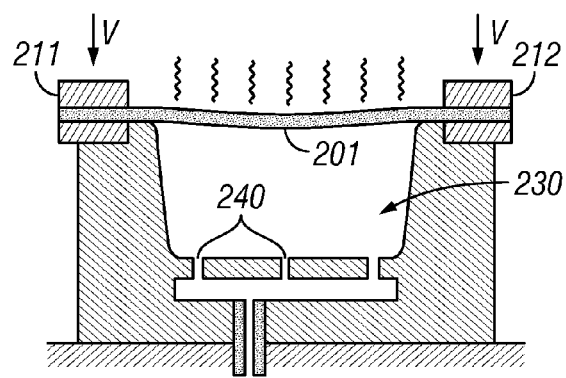
Figure 2C:
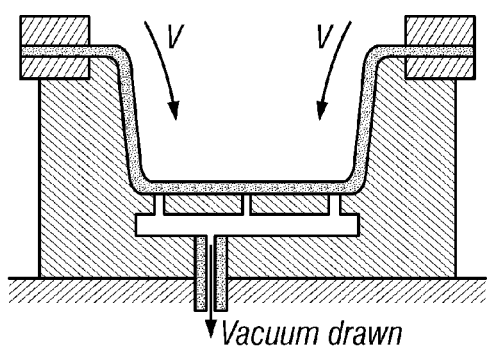

In FIG. 2B the softened sheet 201 is placed over a concave mold cavity 230. As shown in FIG. 2C, a vacuum created through vacuum holes 240 draws the sheet 201 into the mold cavity 230. In most applications the holes for drawing the vacuum in the mold are on the order of 0.8 mm (0.031 in.) in diameter, so their effect on the plastic surface is minor.

Figure 2D:
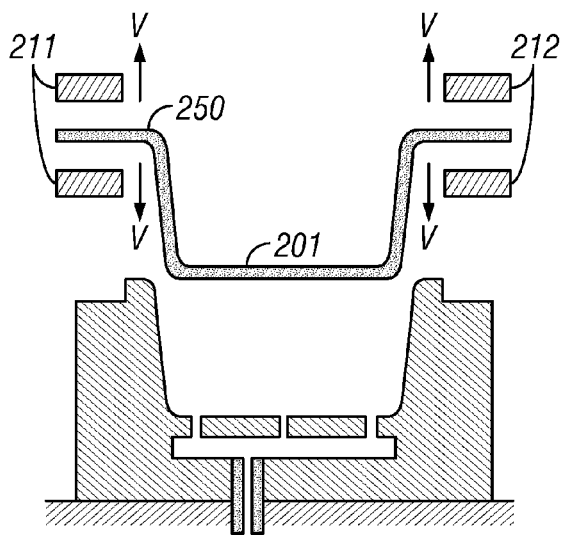

FIG. 2D shows the molded part 201' being removed from the mold after the plastic has hardened from contact with the cold mold surface. After the molded part 201' is removed from the clamps 211, 212, it is trimmed from the web 250, which is the residual plastic that was held within the clamps 211,212 but is not part of the mold design.

Figure 3:
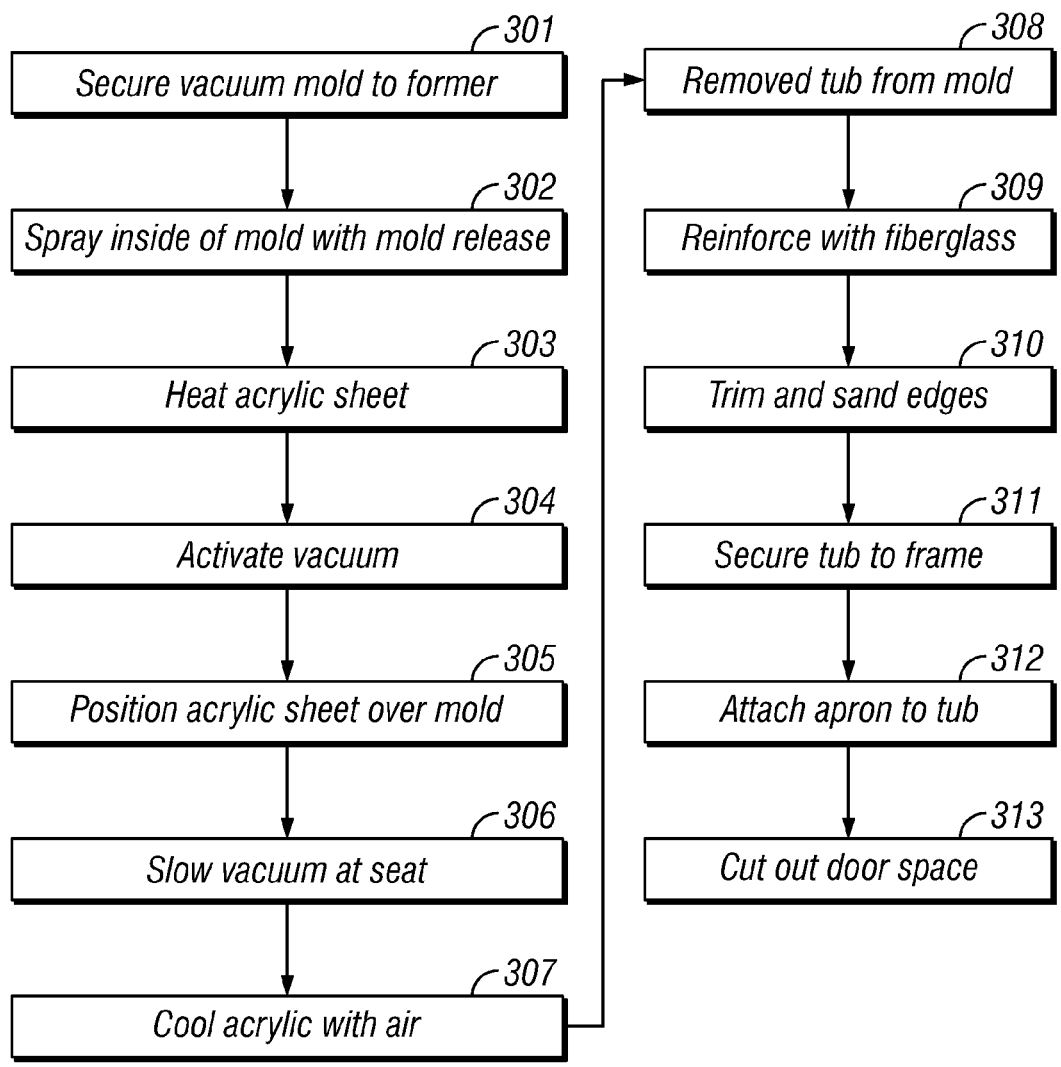
FIG. 3 is a flowchart illustrating the process of forming a walk-in bathtub in accordance with a preferred embodiment of the present invention.

FIG. 3 is a flowchart illustrating the process of forming a walk-in bathtub in accordance with a preferred embodiment of the present invention. The process begins by fitting the vacuum mold to the former (step 301) and spraying the inside of the mold with a mold release (step 302). It should be pointed out that mold release agents are not always used in vacuum forming. However, experience in developing the method of the present invention revealed that a release agent facilitated the even flow of the acrylic over the surface of the mold due to the depth of the mold.

Next, the acrylic sheet is heated (step 303). In the preferred embodiment, the acrylic sheet used to form the tub comprises continuous cast Lucite XL acrylic 0.187. However, other acrylics with similar characteristics may be used. The oven that is used to heat the sheet is a multi-zoned oven that allows the acrylic sheet to be heated to different temperatures at different points of the sheet.

Figure 4:
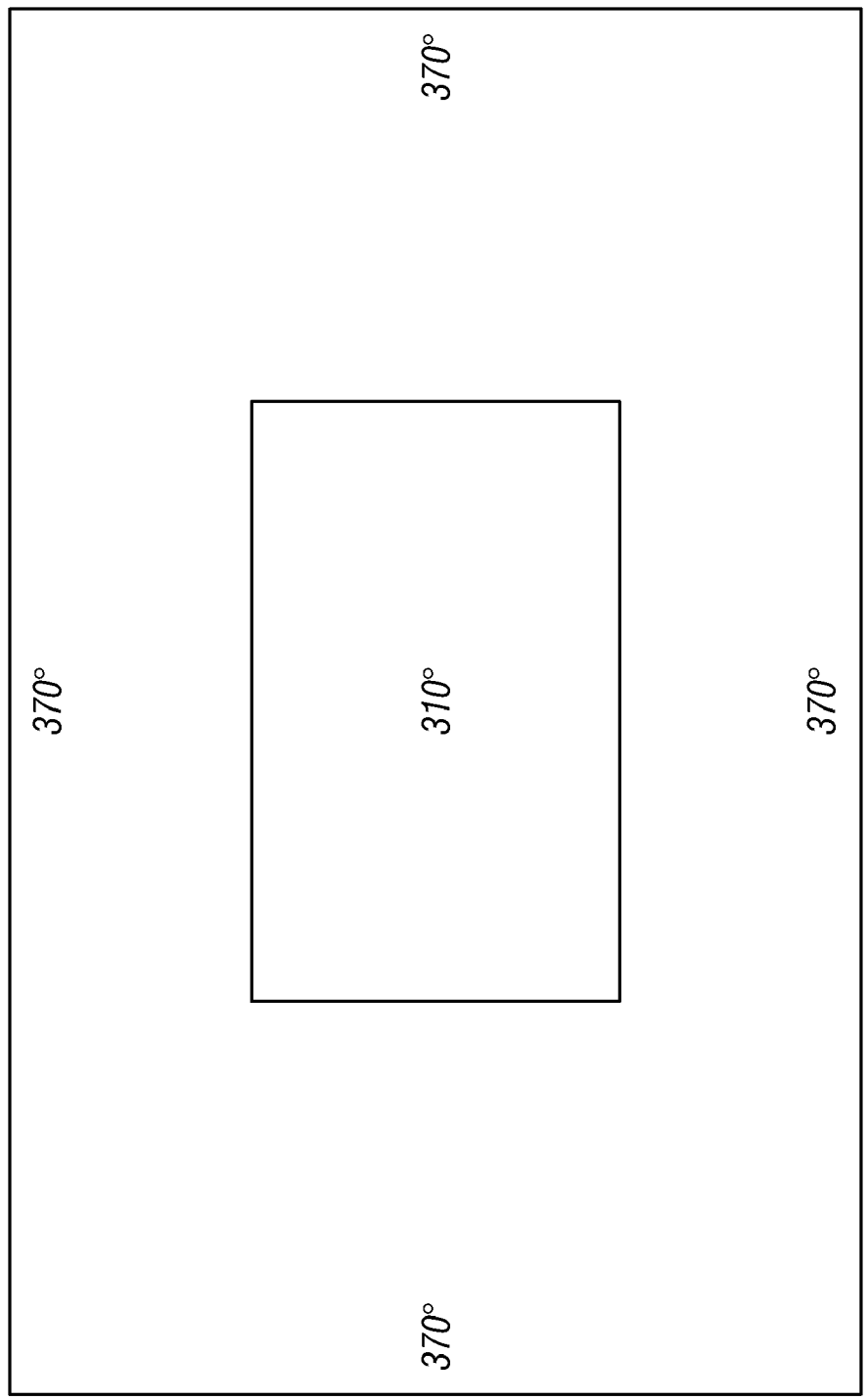
FIG. 4 illustrates the temperature differential used in heating the acrylic sheet in accordance with the preferred embodiment of the present invention.

FIG. 4 illustrates the temperature differential used in heating the acrylic sheet in accordance with the preferred embodiment of the present invention. The outer portion of the sheet is heated to approximately 370° F., and the inner portion is heated to 310° F. The purpose of using this heating differential is to minimize differences in stretching between different regions of the acrylic sheet as it cools moves along the surface of the mold while cooling. Because of the depth of the foot well in the tub (up to 33 inches) great care is taken to ensure that the acrylic forming the sides of the tub does not cool too quickly as it moves along the sides of the mold. If the acrylic cools too quickly it will begin to stretch unevenly, with the acrylic becoming progressively thinner as it approaches the bottom of the foot well, similar to stretching a piece of cold taffy. The higher temperature (370° F.) used for the outer portion of the acrylic sheet helps maintain the proper viscosity of the acrylic long enough to complete the vacuum forming process before contact with the mold surface cools the acrylic. The use of the mold release also facilitates the even stretch of the acrylic as it moves over the surface of the mold.

The outside is heated at a higher temperature to allow more of that area to be pulled into the foot well. However, if the center was the same temperature as the outer portion it would have to stretch the full depth of the tub in the area and would pop before reaching the bottom. The temperatures used in the method of the present invention allow for proper distribution of the acrylic sheet to achieve the required thickness at the deepest point.

Returning to FIG. 3, after the acrylic sheet is heated, the vacuum is activated (step 304), and the heated acrylic sheet is placed over the mold (step 305). The mold is pushed into the heated acrylic two and a half inches and the rest is formed by the vacuum. The vacuum is initially started at a pressure of approximately 25 inches of mercury.

In one embodiment of the present invention, the mold is actually held upside down and the acrylic is drawn upward into the mold. The inverted mold configuration is used for bathtub models that have the side apron integrated with the main body of the bathtub as a single piece (explained in more detail below). Manufacturing experience has revealed that attempting to pull the integral apron with the mold positioned right side up often tears the acrylic sheet.

As the acrylic sheet is drawn into the mold, the vacuum is manually reduced as the acrylic reaches the top of the seat and then shut off when the acrylic is approximately two inches from the bottom of the tub so that the sheet pulls slower (step 306). Due to uncontrollable pressure and environmental changes this is manual process and requires a skilled vacuum operator. Slowing the vacuum allows a larger part of the sheet to be drawn in the well of the tub (the deepest point). Too much vacuum will cause the center portion of the sheet to overstretch because the outsides of the sheets have not been fully maximized. Shutting off the vacuum approximately two inches above the bottom allows for a consistent uniform forming of the radius.

The acrylic is cooled with air (step 307) and then removed from the mold (step 308).

After removal from the mold, the tub is reinforced with fiberglass (step 309). This comprises a multi-step process of spraying fiberglass onto the underside of the molded tub and letting each application cure before adding the next layer. In the preferred embodiment, two to three applications of fiberglass are used to reinforce the tub.

Figure 5:
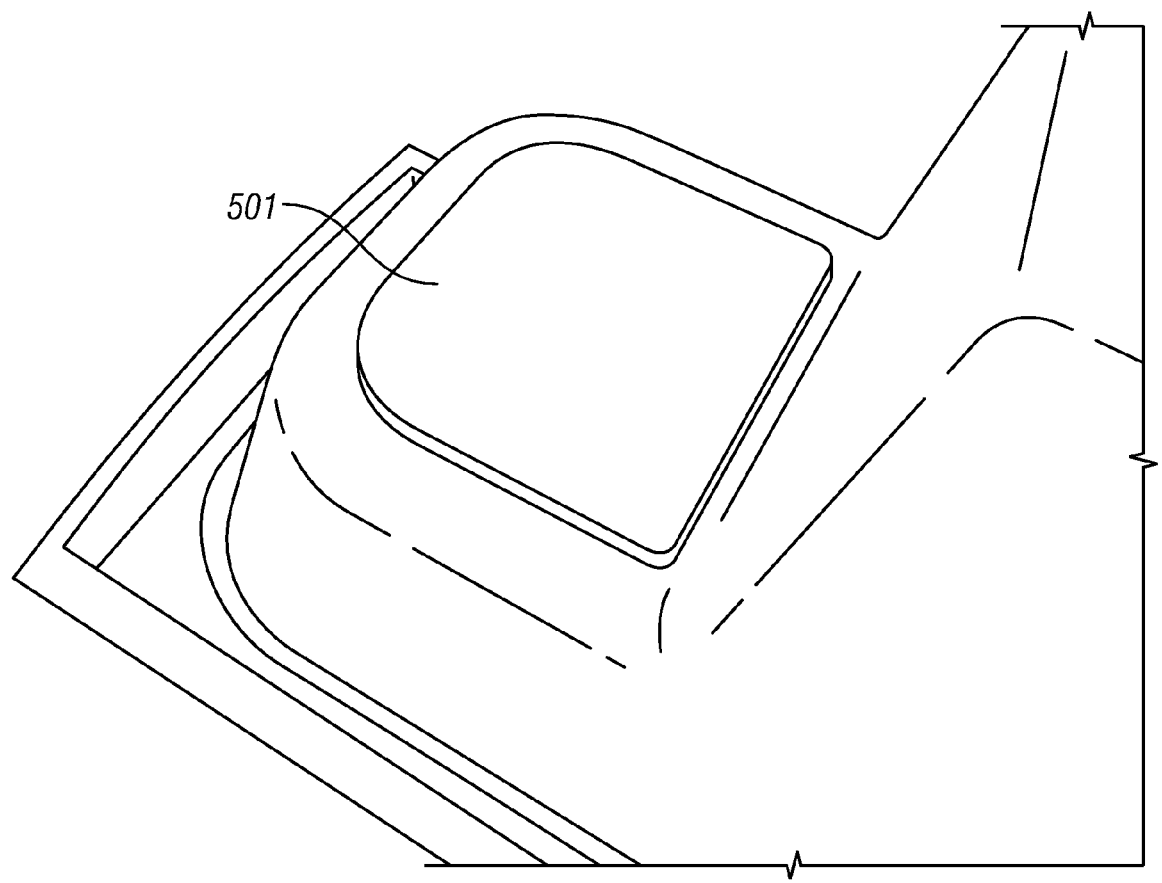
FIG. 5 shows the wood support for the underside of the seat.

Wood supports are fiberglassed to the well and the seat after the first spraying to provide structural support. FIG. 5 shows the wood support 501 for the underside of the seat. The wood support 701 for the foot well is more clearly illustrated in FIG. 7.

After the fiberglass has cured, the edges of the tub are trimmed from the web and then sanded (step 310).

Figure 6:
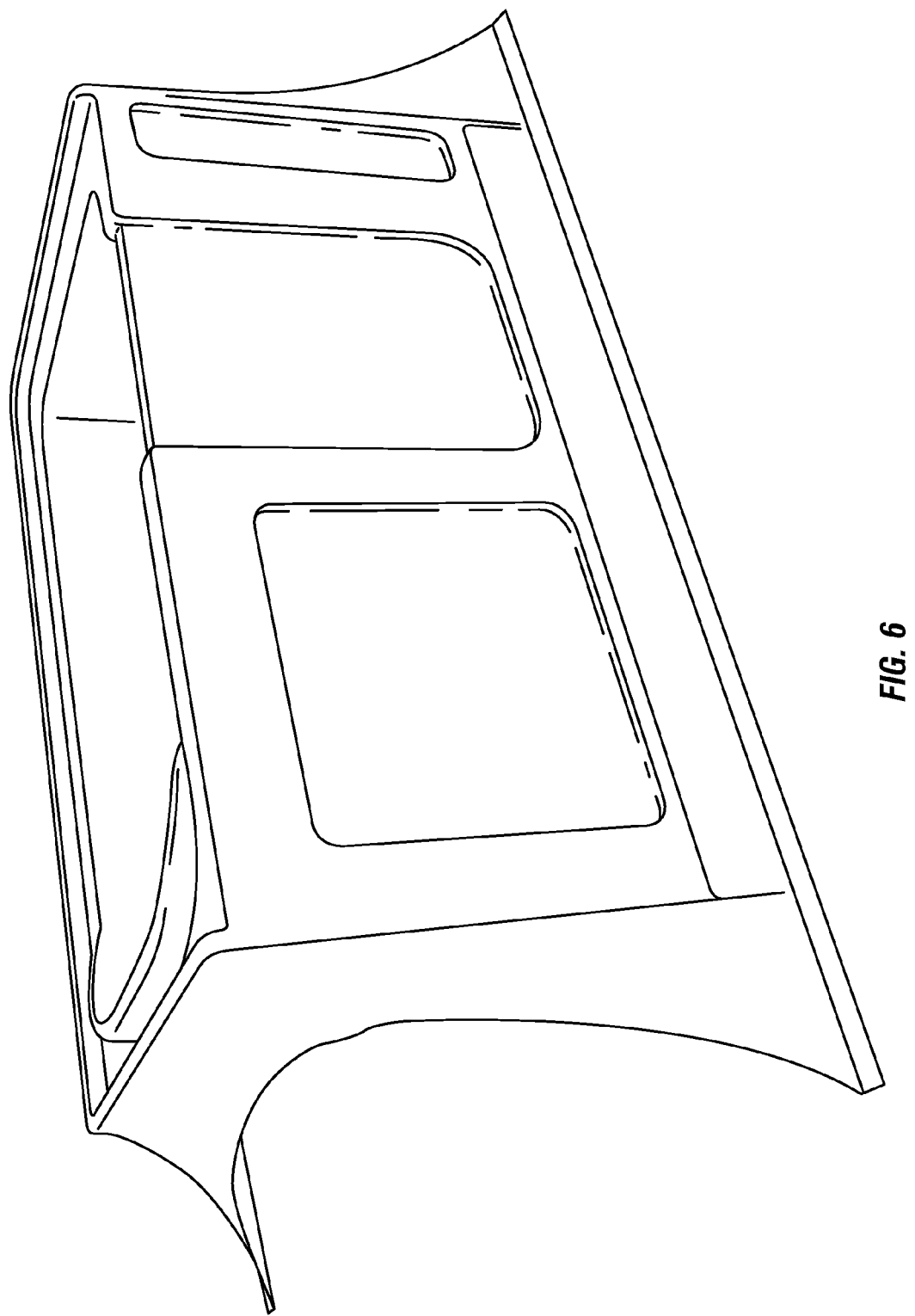
FIG. 6 shows an example of a bathtub with an integrated side apron in accordance with an embodiment of the present invention.
Figure 7:
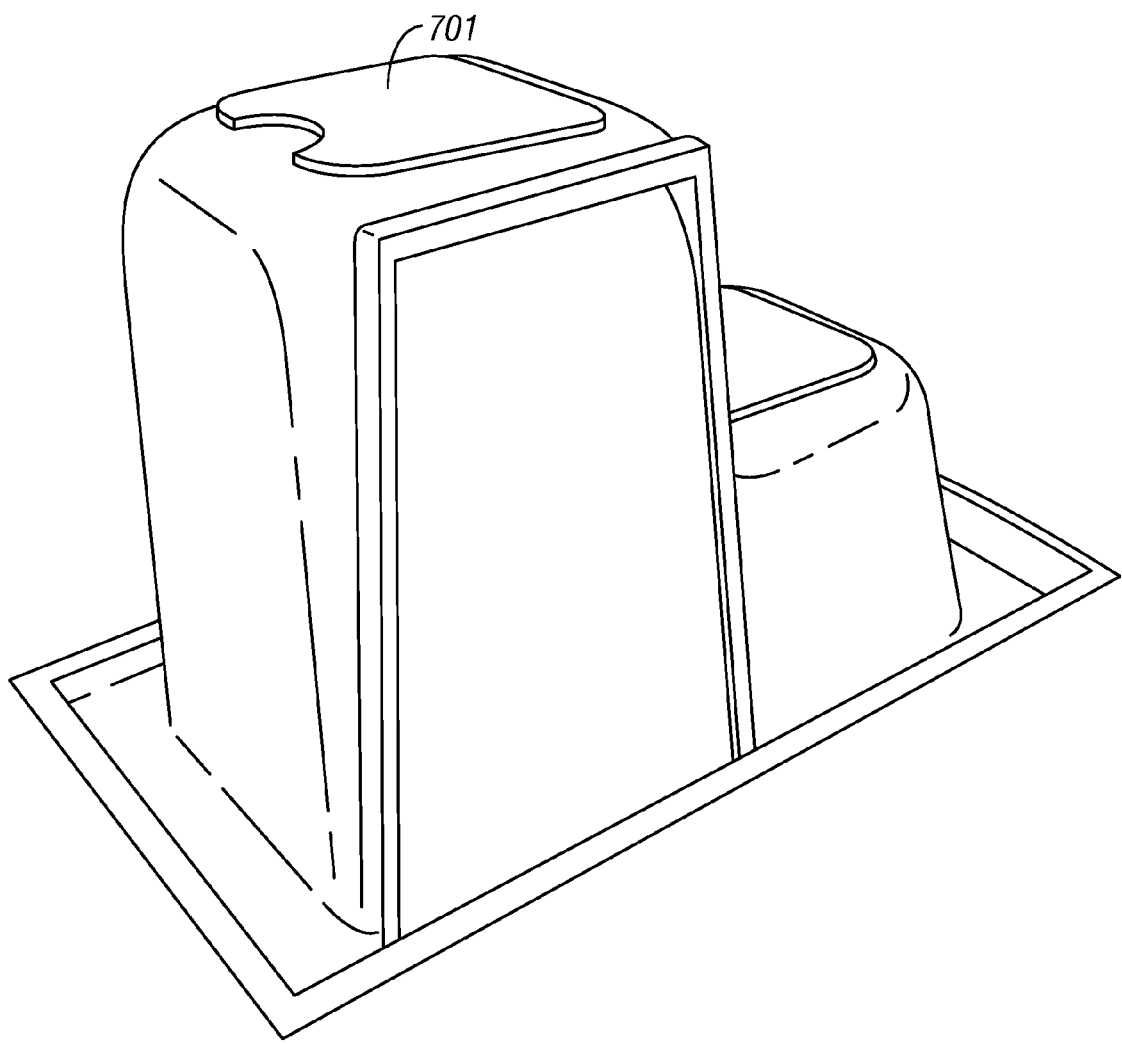
FIG. 7 shows a bathtub without an apron in accordance with an alternate embodiment of the present invention.

The method of the present invention can be applied to form two main types of tubs. The first type includes the side apron with the main body of the tub as one integral piece, as shown in FIG. 6. The second type of tub does not include the side apron as an integral piece, as shown in FIG. 7 (which pictures the tub upside down for fiberglass application).

The advantage of having the apron as an integrated part of the tub is that it reduces the number of manufacturing steps. However, having the apron integral with the tub limits the depth of the foot well because the sheet has to be formed inside and outside of the mold which requires a much larger sheet of acrylic. Another disadvantage of the integrated apron is the gap in the door space, explained in more detail below. The preferred embodiment of the present invention has the side apron manufactured as a separate piece which is later added to the tub.

Once the body of the bathtub has been formed, reinforced, and trimmed and sanded, it is secured to a freestanding metal support frame (step 311).

Figure 8:
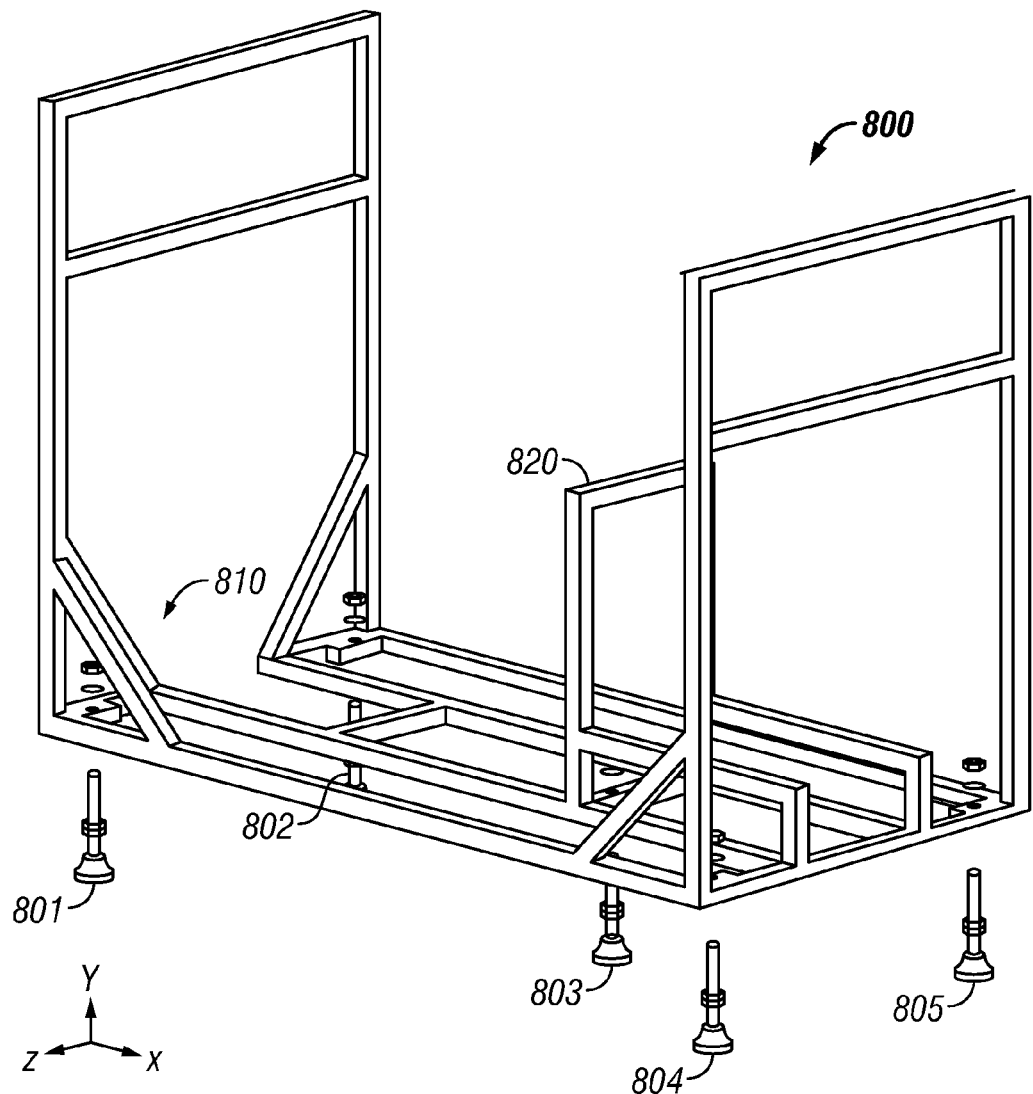
FIG. 8 shows an example of a support frame in accordance with a preferred embodiment of the present invention.

FIG. 8 shows an example of a support frame in accordance with an embodiment of the present invention. The frame 800 is designed to keep the side door from flexing when water is added to the bathtub or due to moisture changes in the bathroom. In addition, its design allows for quick and easy field and manufacturing installation. The cut out 810 on the faucet side makes it easy to install the plumbing. The five adjustable leveling feet 801-805 also enable reverse plumbing, which comprises running the faucets under the tub when the door needs to be on a particular side and the plumbing is on the opposite side. The adjustable feet 801-805 also allow one to drop the tub (if the tub plumbing can be recessed into the floor) to further drop the walk-in threshold making it even easier to get into the tub. In the preferred embodiment, the feet allow the tub to be dropped up to two and half inches. The frame 800 also includes a support 820 for the seat of the tub.

Figure 9:
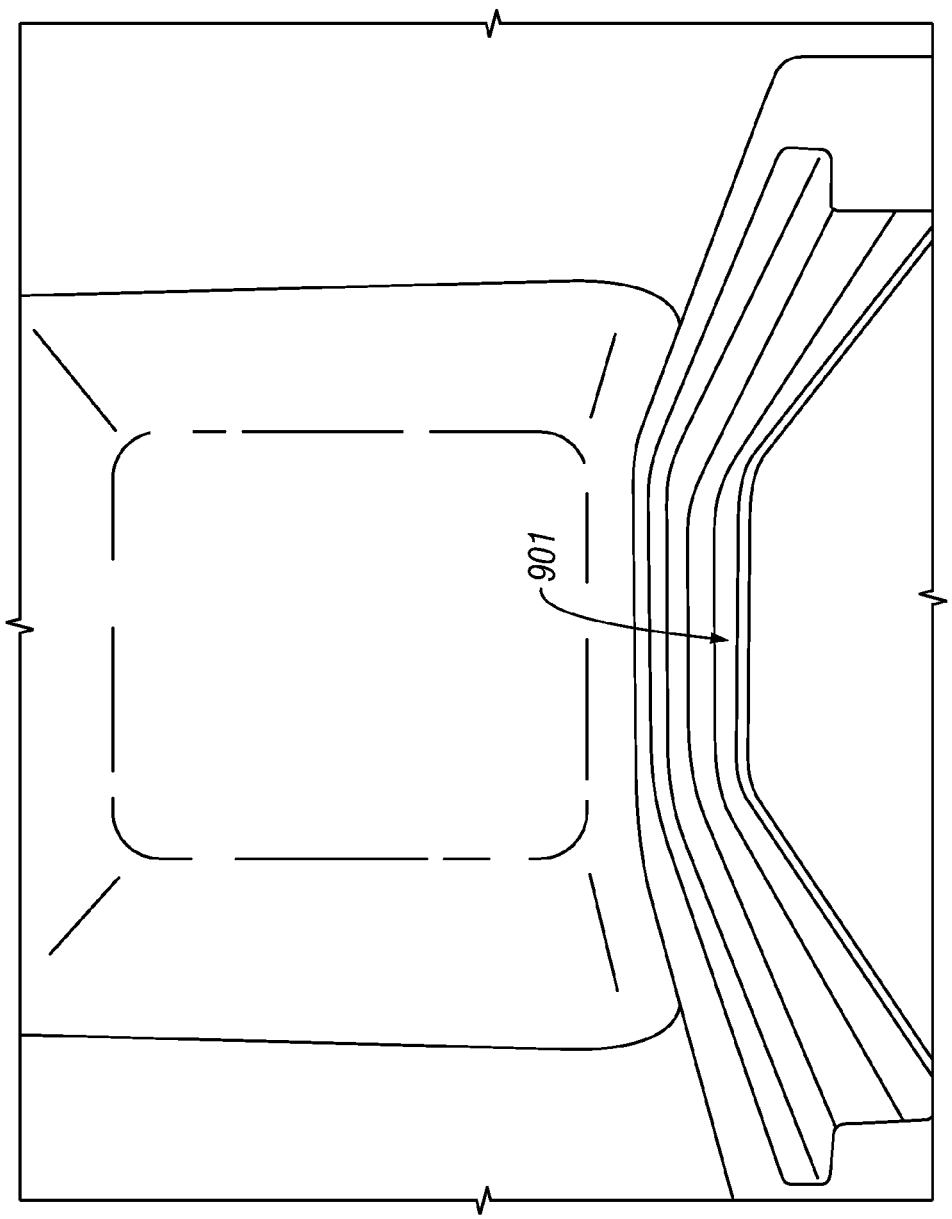
FIG. 9 shows the space between the apron and tub side wall in accordance with an embodiment of the present invention.

In the preferred embodiment, after the tub has been secured to the frame, the apron is attached to the tub (step 312). The space for the walk-in side door is then cut out from the side of the tub (step 313). Bondo putty or waterproof filler is added to the space between the apron and tub side wall. This space 901 is illustrated in FIG. 9.

As stated briefly above, the type of apron will determine the amount of space between the apron and tub wall, and therefore, the amount of putty that has to be used to fill this space. This due to the fact that the bottom of the door threshold that connects the foot well with the apron cannot be formed in the vacuum forming process because the sheet is drawn both to the inside (to create the tub) and the outside (to create the apron), and the thickness of the mold that separates the inside and outside will be the open space when the door is cut out. The example illustrated in FIG. 9 depicts a bathtub with the apron integrated as one piece with the tub.

Figure 10:
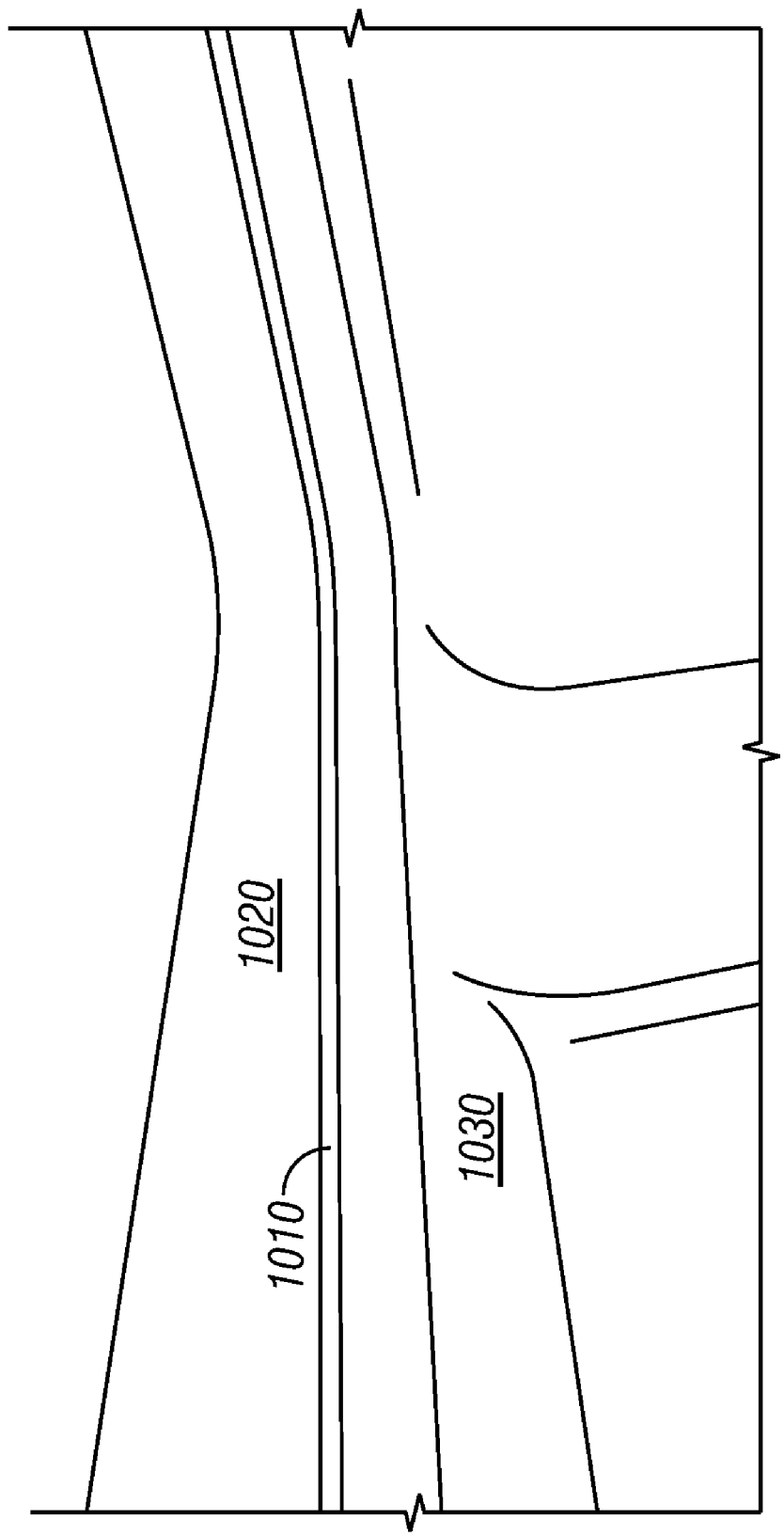
FIG. 10 shows the door threshold of a tub with the apron as a separate piece in accordance with the preferred embodiment of the present invention.

FIG. 10 shows the door threshold of a tub with the apron added as a separate piece. In contrast to the integrated apron, if the apron is added to the tub as a separate piece there is a smaller gap between the apron and tub wall because the apron can be constructed to cover the necessary space of the door threshold and then attached to the tub. An important feature of the apron is the depth of the threshold, which in the preferred embodiment is approximately two and a half inches. As can be seen in this example, there is a smaller gap 1010 between the apron 1020 and tub wall 1030, which significantly reduces the labor intensive manufacturing steps of filling the entire threshold with putty.

Figure 11:
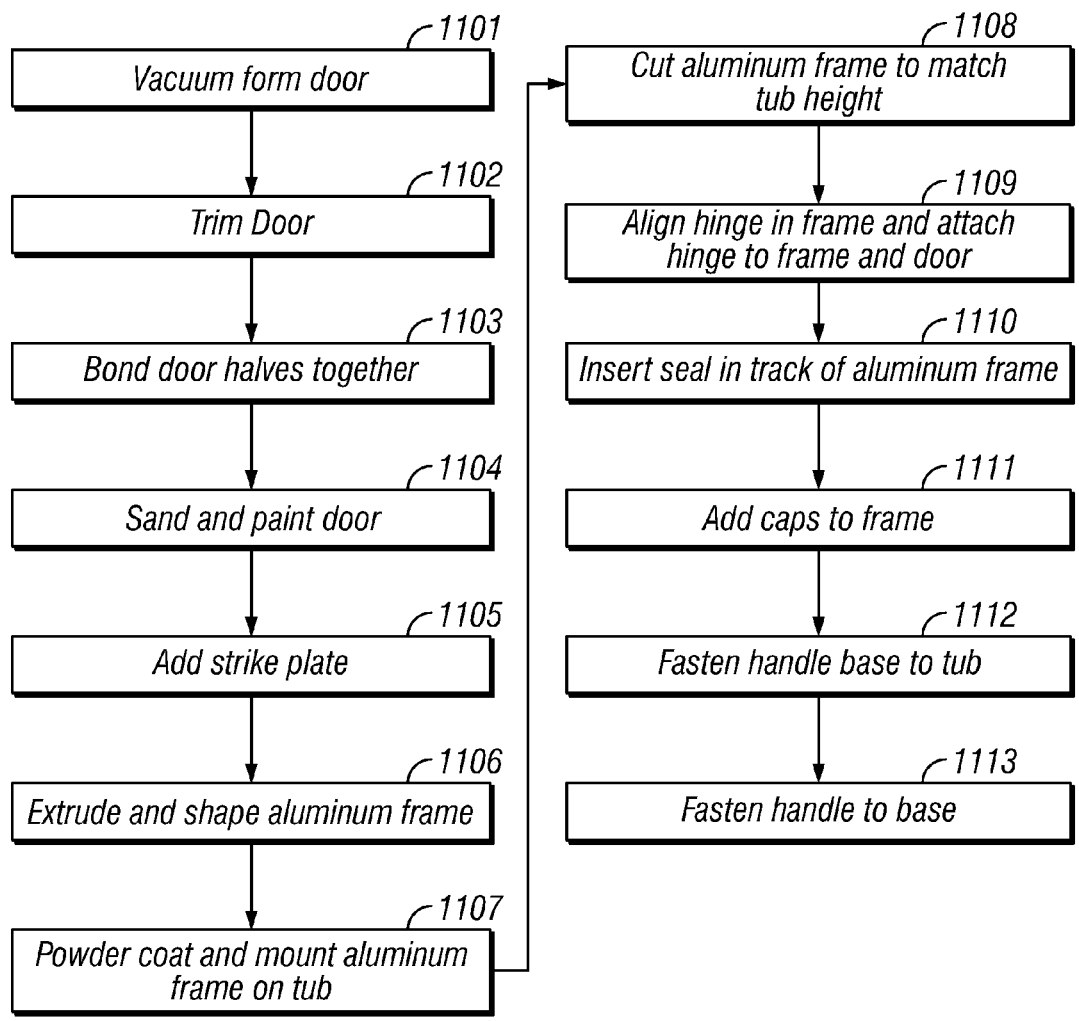
FIG. 11 is a flowchart depicting the process of manufacturing a door assembly for a walk-in bathtub in accordance with a preferred embodiment of the present invention.
Figure 12:
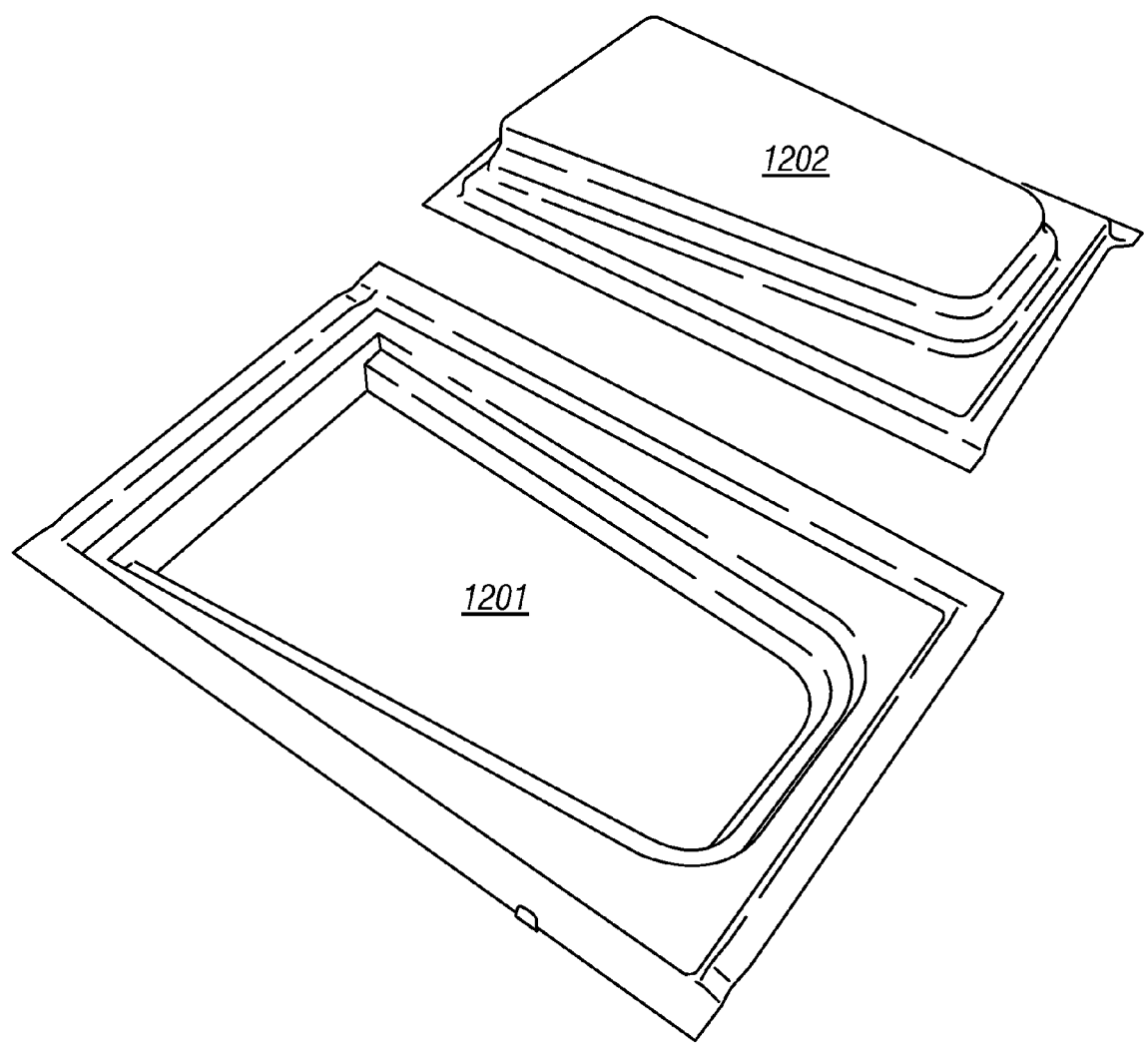
FIG. 12 shows two example threshold door pieces, one facing up and the other facing down.

Referring now to FIG. 11, a flowchart illustrates the process of manufacturing a door assembly for a walk-in bathtub in accordance with a preferred embodiment of the present invention. The door itself is comprised of two main pieces. The threshold piece is vacuum formed to fit within the door threshold in the side of the tub (step 1101). FIG. 12 shows two examples of the threshold door pieces 1201, 1202, one facing up and the other facing down. After the threshold piece is vacuum formed, it is trimmed from the web (step 1102).

Figure 13:
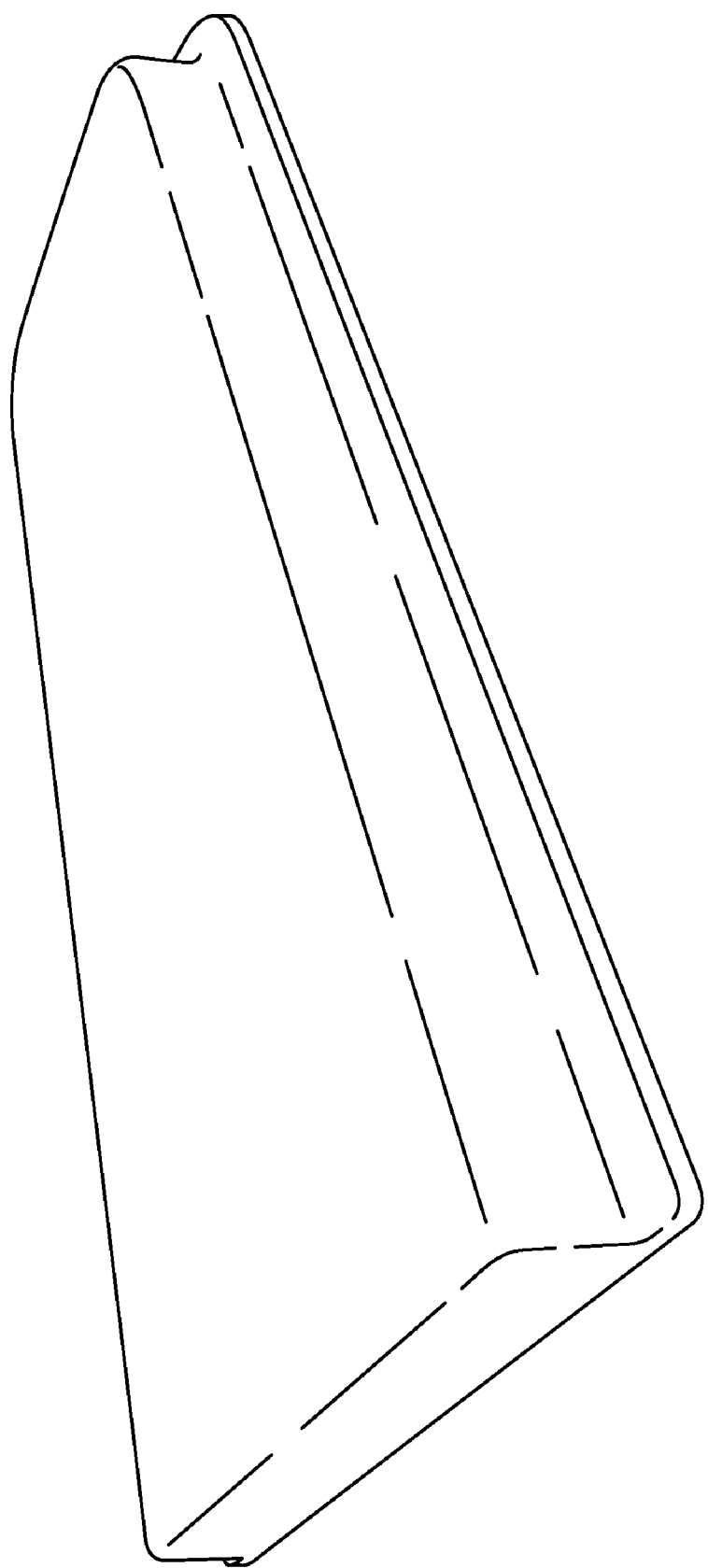
FIG. 13 shows an assembled side door after it has been sanded and painted.

The second piece of the door is a flat panel that simply covers the indentation of the threshold piece. The two door halves are bonded together (step 1103), and the door is then sanded and painted, as shown in FIG. 13 (step 1104). After that, the strike plates are added (step 1105).

The frame for the door assembly comprises a single aluminum piece that is extruded and shaped to fit the edge of the door threshold (step 1106). The extruded frame includes a channel for a rubber gasket that forms part of the tub's water seal. In the preferred embodiment, the extrusion is made with 60-61 or 60-63 aluminum. This type of aluminum allows the extrusion to be bent into the proper shape without pinching the gasket channel.

Figure 14:
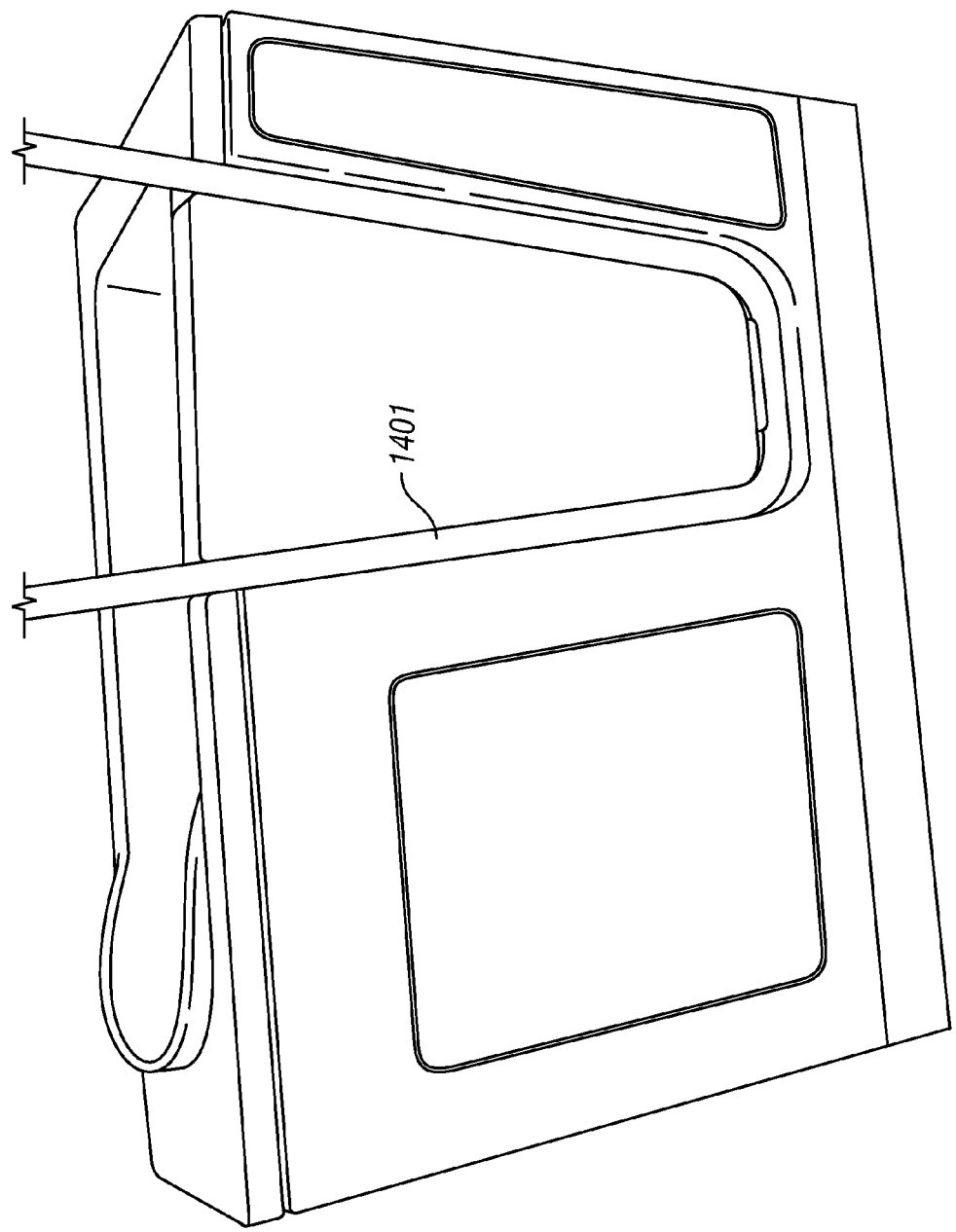
FIG. 14 shows the door frame mounted in place on the door threshold.

After it has been shaped, the extrusion is powder coated and mounted onto the tub (step 1107). FIG. 14 shows the door frame 1401 mounted in place on the door threshold. The frame is secured to the threshold with a waterproof adhesive (e.g., GT-3100 Neutral). The frame 1401 is then secured to the tub by a retaining screw (not shown) to supplement the adhesive.

Figure 15:
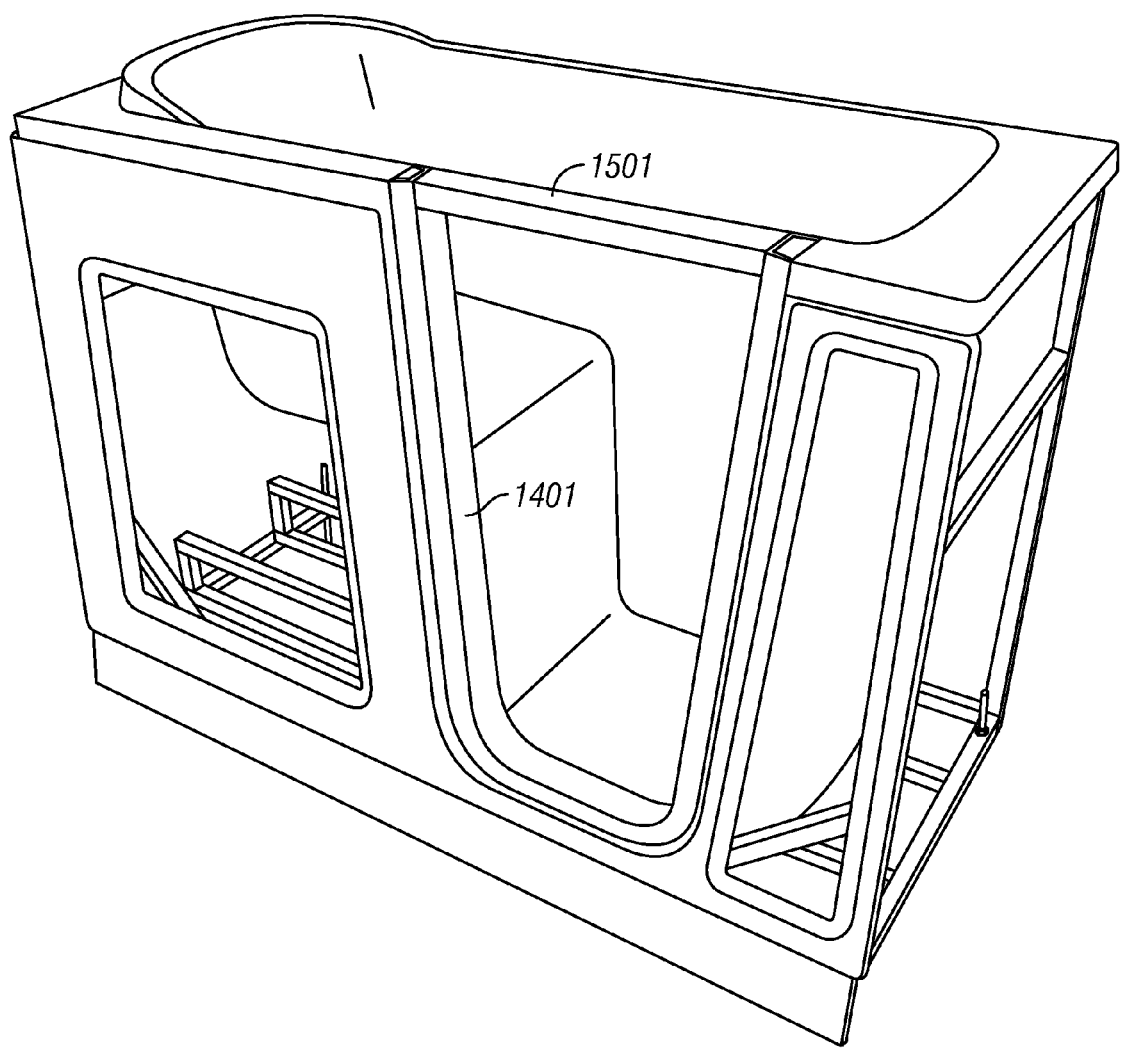
FIG. 15 shows the door frame trimmed to match the height of the tub.

Once is place, the ends of the extruded frame are cut to match the height of the tub (step 1108). FIG. 15 shows the extrusion 1401 after it has been trimmed. As shown in the picture, a piece of wood 1501 or other material may be used to secure the ends of the extrusion 1401 while the adhesive sets.

Figure 16:
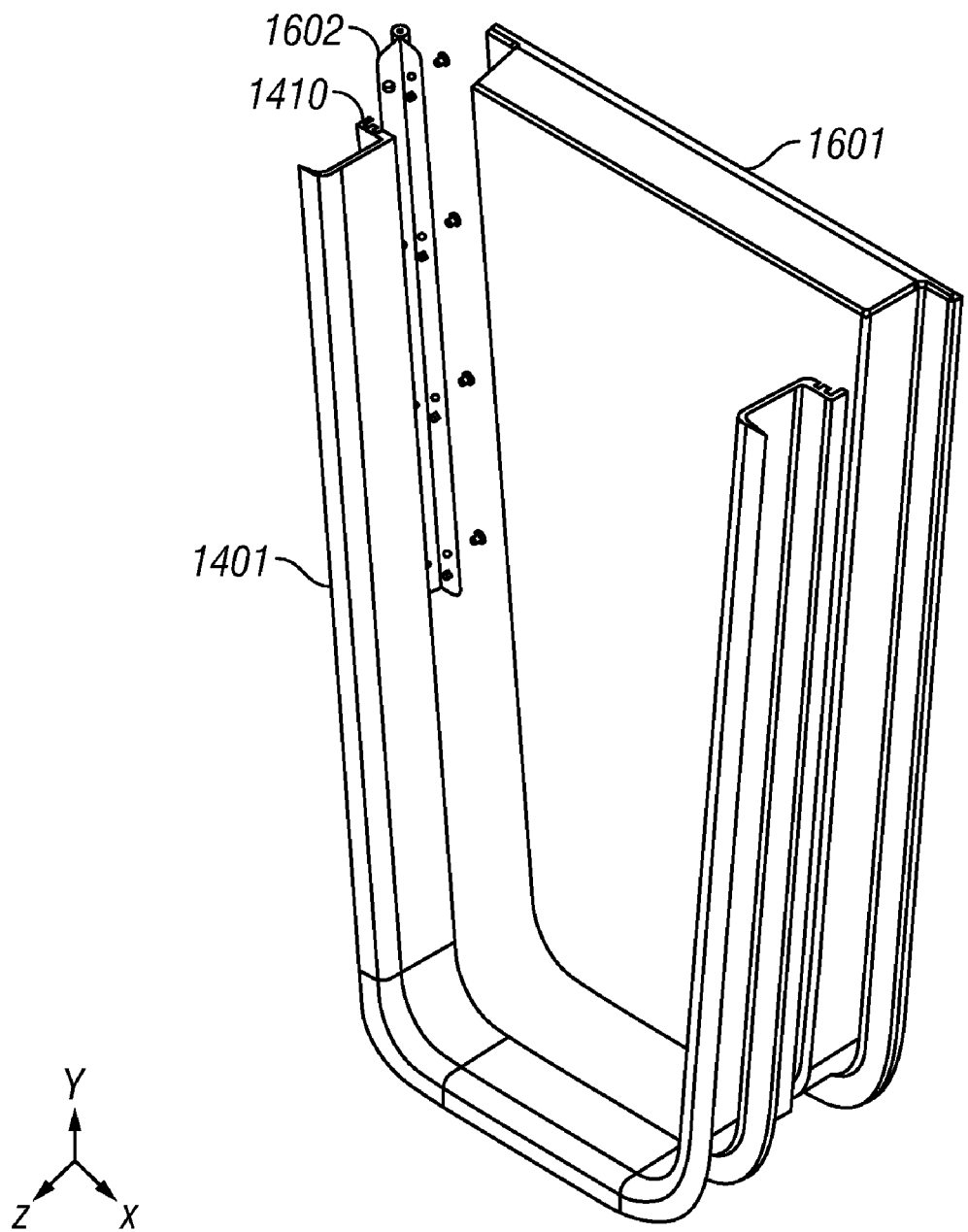
FIG. 16 shows an exploded perspective view illustrating how the door frame, door, and hinge fit together.

After the door frame is securely in place, the hinges of the door are aligned and attached to the frame and door (step 1109). FIG. 16 shows an exploded perspective view illustrating how the door frame 1401, door 1601, and hinge 1602 fit together. The frame includes a track 1410 on the outer edge that is specifically dedicated to mounting the hinge 1602.

After the door is mounted, a gasket is inserted into the seal track of the frame, as illustrated in FIG. 17 (step 1110). The gasket 1701 helps form the water tight seal of the door. FIG. 17 also clearly shows the dedicate hinge track 1410 on the door frame 1401.

Figure 18A:
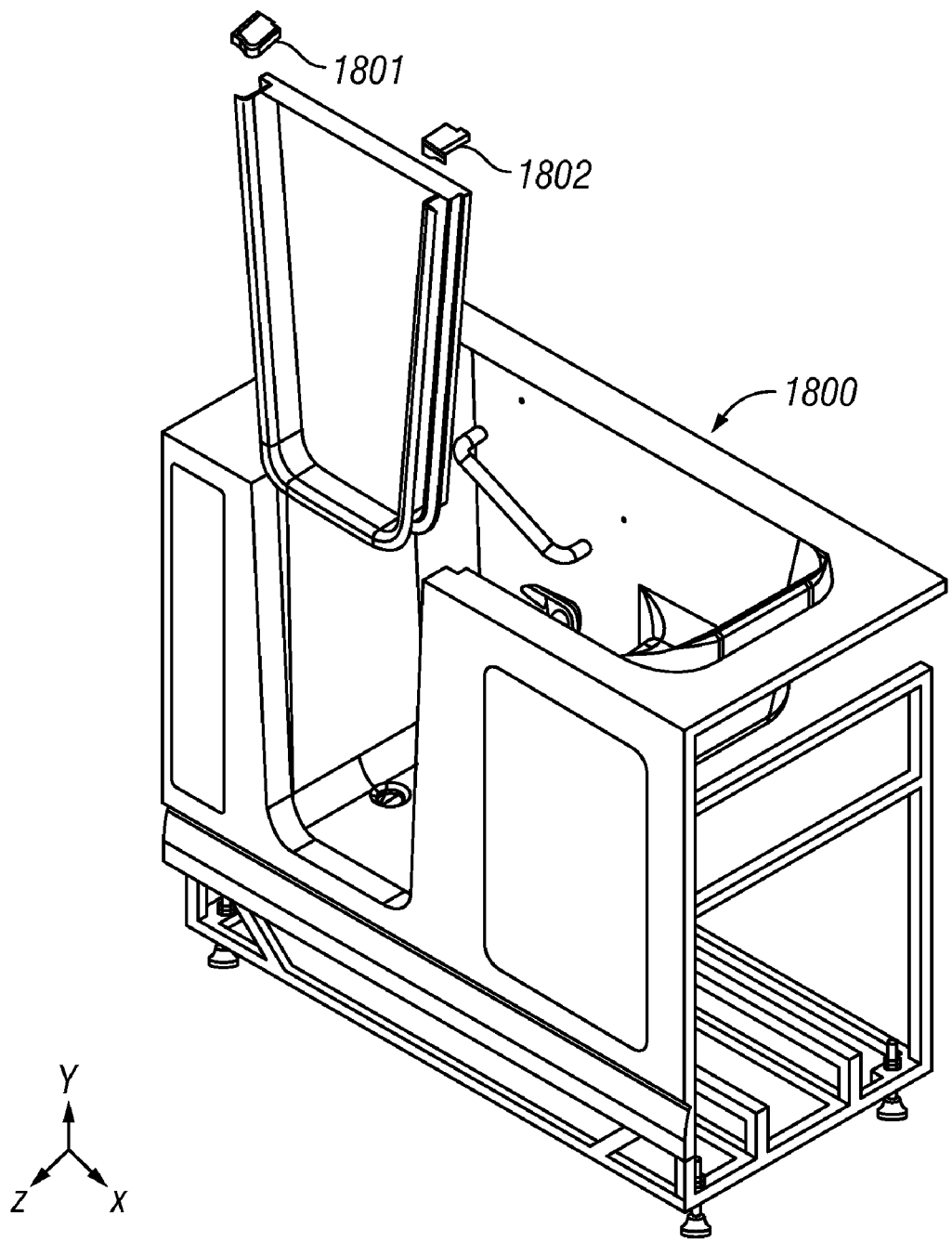
FIG. 18A is an exploded perspective view of the walk-in bathtub showing the relationship between the main components of the tub.
Figure 18B:
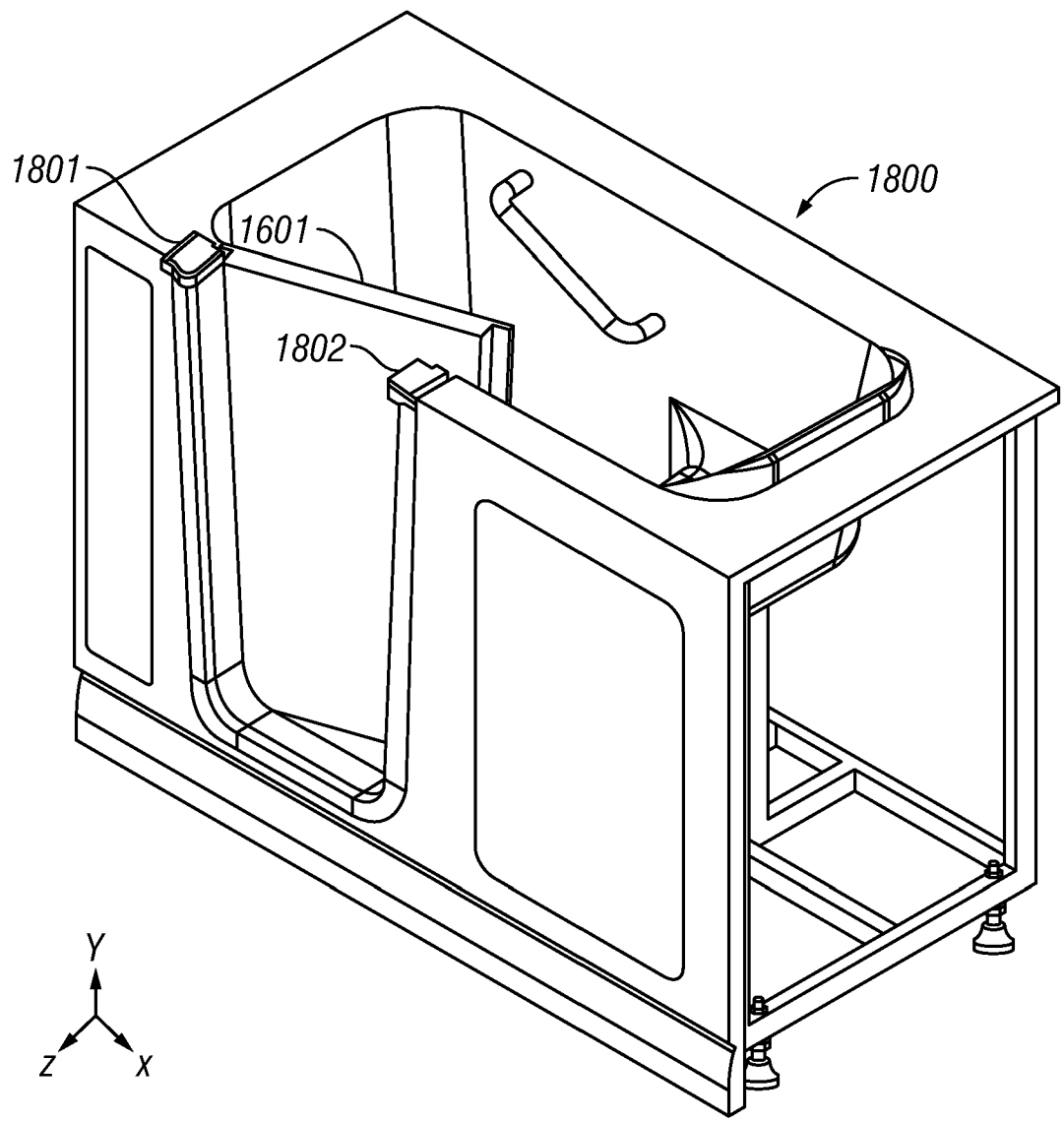
FIG. 18B shows a perspective view of the fully assembled walk-in bathtub.

Caps 1801, 1802 are added to ends of the aluminum frame, as show in FIGS. 18A and 18B, which shows a finished tub and door (step 1111). Using caps over ends of the frame helps reduces labor costs and speeds up the production process, as well as helping to blend the extrusion with the tub frame.

Figure 19:
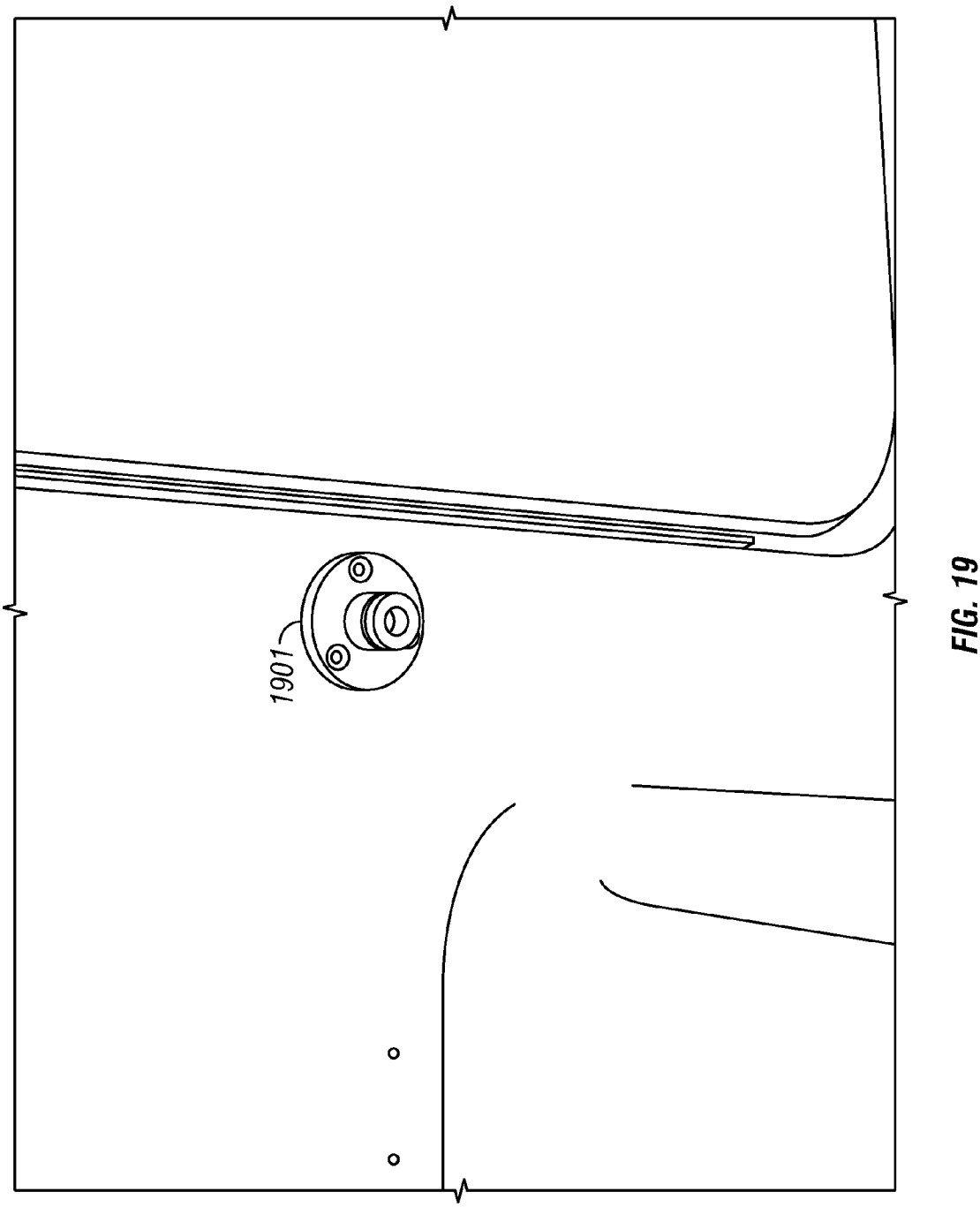
FIG. 19 shows the base for the door handle mounted onto the inside wall of the bathtub.
Figure 20:
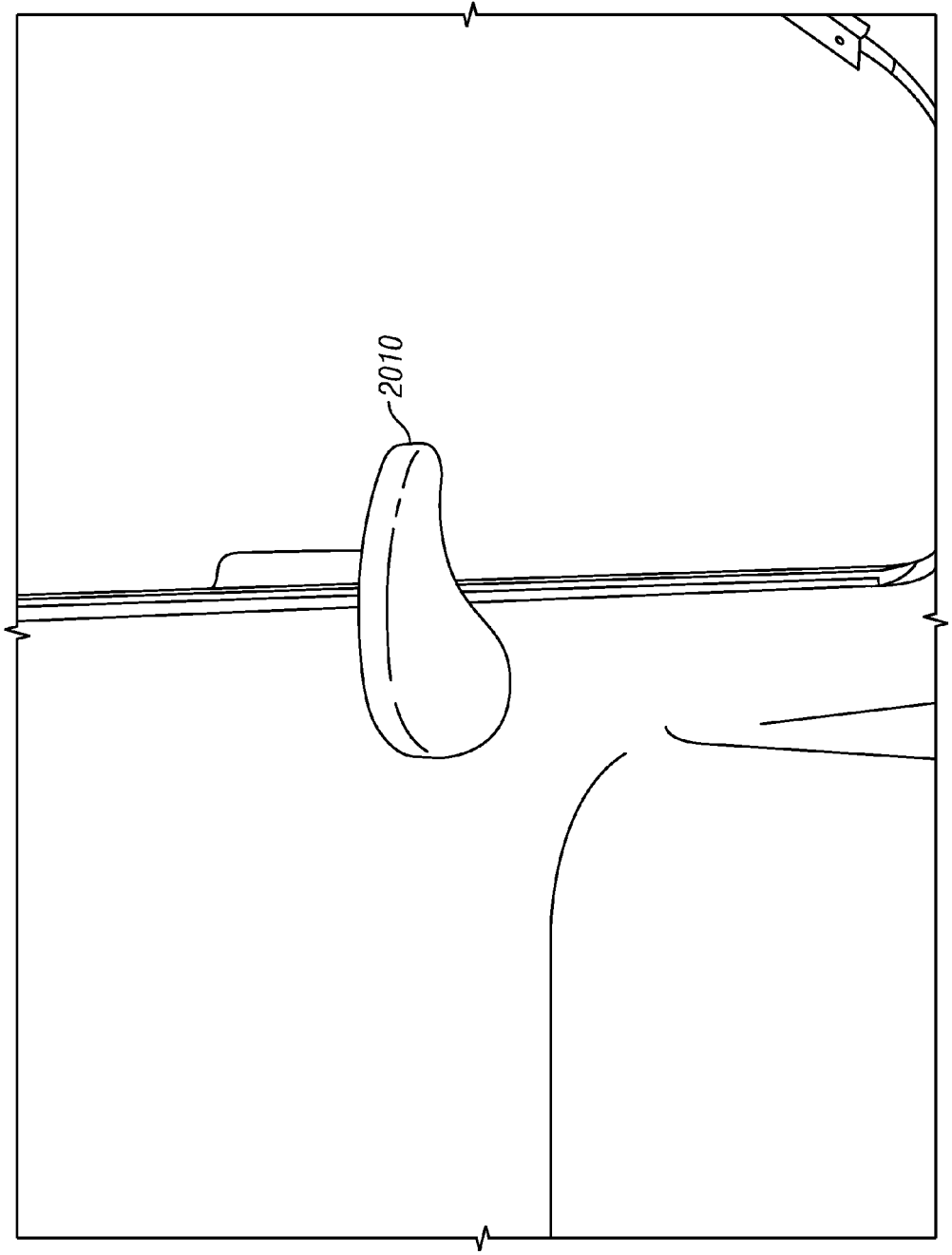
FIG. 20 shows the door handle mounted onto the handle base.

Finally, the handle base 1901 is fastened to the tub (step 1112), shown in FIG. 19. The handle 2010 is then fastened to the base, as shown in FIG. 20 (step 1113).

The door of the present invention is similar to a regular pre-hung door that would be found in a house and can be installed into the tub as a separate, pre-assembled unit. Prior art walk-in tubs have the door attached directly to the side of the tub, which is analogous to mounting a house door directly to the wall. The extruded frame used in the present invention provides structural integrity to the tub and insures proper alignment of the system as it is contained as one unit. The frame keeps the walls of the tub from flexing, and the dedicated hinge track helps keep the door aligned, thus maintaining the integrity of the water seal. The metal frame also improves the door seal by covering surface inconsistencies that often occur with acrylic, especially at the depths used in the present invention (i.e. up to 33 inches). In addition, the frame improves the door seal by provides a dedicated track for the gasket. The dedicated tracks also allow for easy maintenance if anything goes wrong in the field.

FIG. 18A is an exploded perspective view of the walk-in bathtub 1800 showing the relationship between the main components of the tub. FIG. 18B shows a perspective view of the fully assembled walk-in bathtub 1800. As shown in FIG. 18B, the door 1601 opens to the inside of the tub 1800, unlike the door of the prior art tub shown in FIG. 1. Because the side door 1601 opens to the inside, the water seal is largely maintained by outward hydrostatic pressure when the tub is filled with water.

Figure 21:
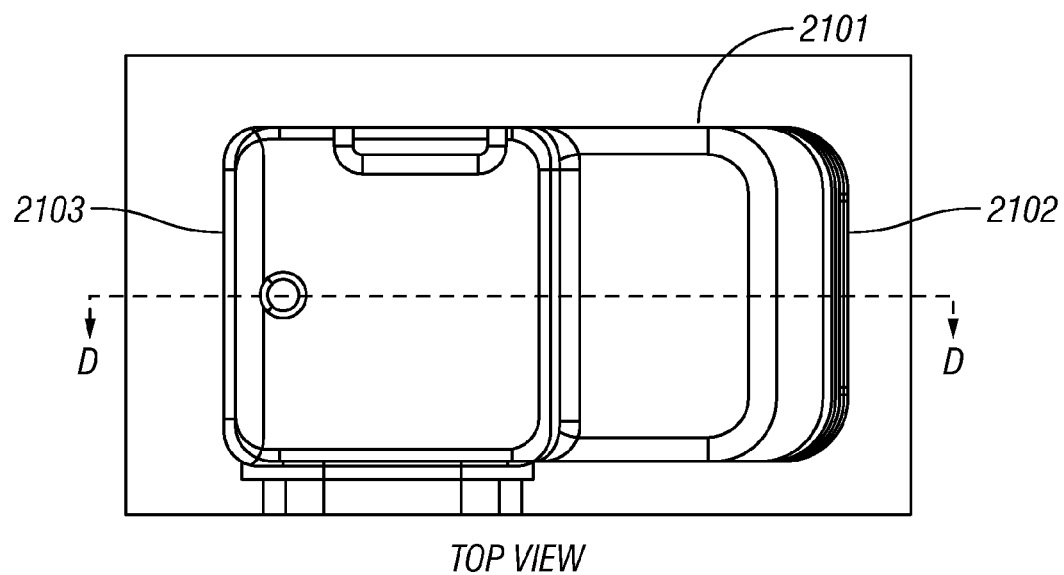
FIG. 21 is a top plan view of the assembled walk-in bath tub.

FIG. 21 is a top plan view of the assembled walk-in bath tub.

Figure 22:
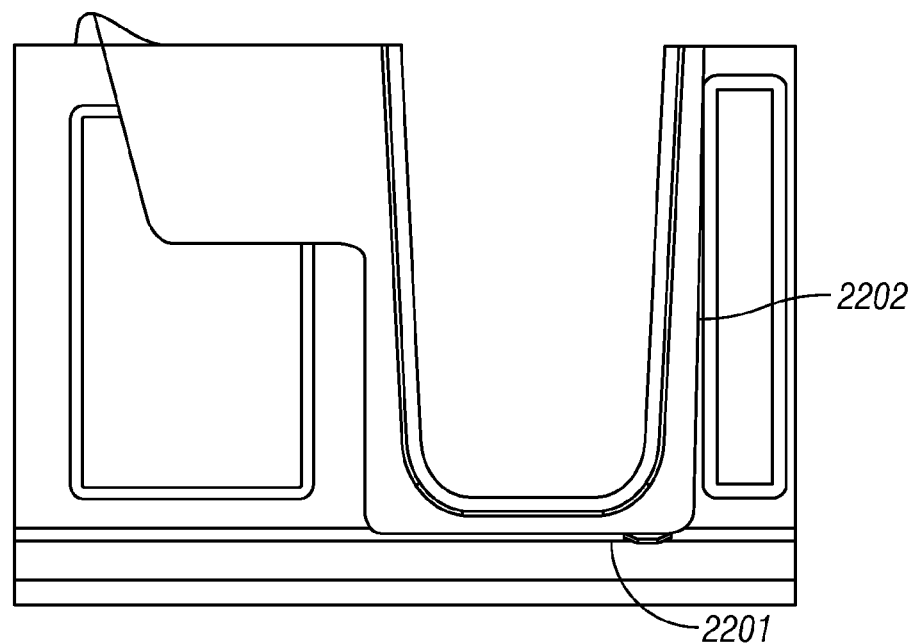
FIG. 22 is a cut away side view of the walk-in bathtub.

FIG. 22 is a cut away side view of the walk-in bathtub. This view clearly shows the depth of the foot well in relation to the seat of the tub.

An important element in properly vacuum forming the acrylic tub is using the proper radius for each corner of the tub. If one attempts to make sharper radii, this will invariably tear the acrylic during the vacuum forming process. As can be seen in FIGS. 21 and 22, each corner of the molded tub is rounded. For example, the bottom edge of the foot well of the tub has a radius of three inches (76.2 mm). The radius refers to the distance taken to make the rounded transition from one straight surface to another, in this case the horizontal bottom 2201 to the vertical wall 2202 of the foot well. (If the corner was 90°, the radius would of course be zero.) Similarly, the radius between the side walls 2101, 2102 in the seat area is approximately nine inches (228.6 mm), while the radius between the side walls 2101, 2103 of the foot well is approximately two and a half inches (63.5 mm). The method of the present invention may be used to make walk-in tubs of various depths, lengths and widths. However, experience has demonstrated the above radii to be the most consistently useful regardless of the dimensions of the tub.

The method of the present invention allows for the vacuum forming of acrylic to depths that are unattainable by prior art methods relative to width and length. In one embodiment of the present invention, the floor of the foot well is 17 inches below the height of the seat, with an overall depth of 33 inches. The length and width of the opening of the tub are 43 inches and 24 inches respectively. This depth relative to length and width is not possible using prior art methods.

Figure 23:
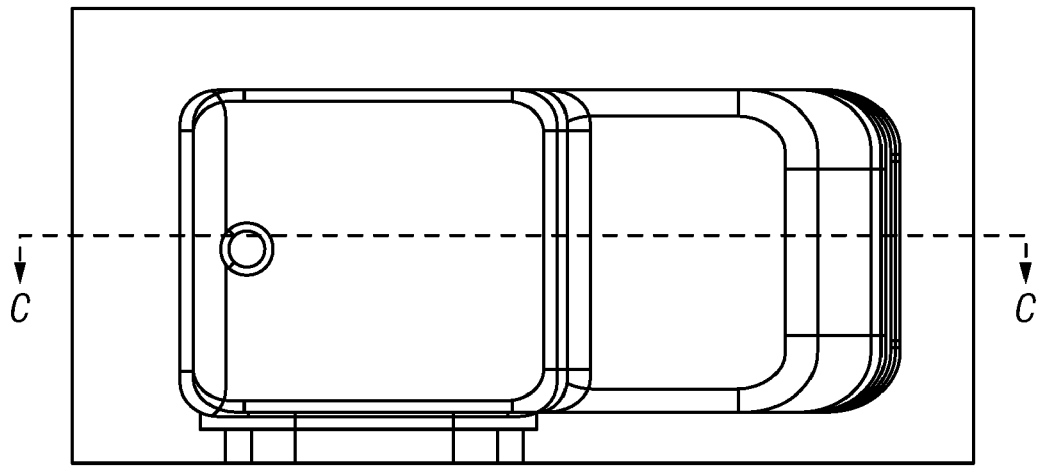
FIG. 23 is a top plan view of an alternate embodiment of the walk-in bath tub.

FIG. 23 is a top plan view of an alternate embodiment of the walk-in bath tub. This tub is similar in dimensions to the one pictured in FIGS. 21 and 22 but with a narrower width.

Figure 24:
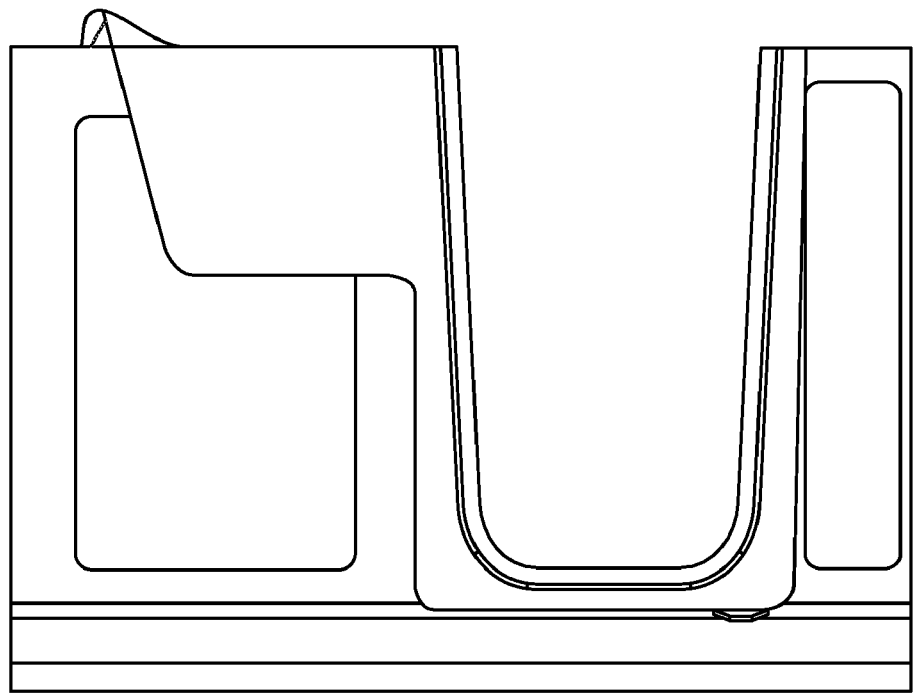
FIG. 24 is a cut away side view of the walk-in bathtub depicted in FIG. 23.

FIG. 24 is a cut away side view of the walk-in bathtub depicted in FIG. 23.

Figure 25:
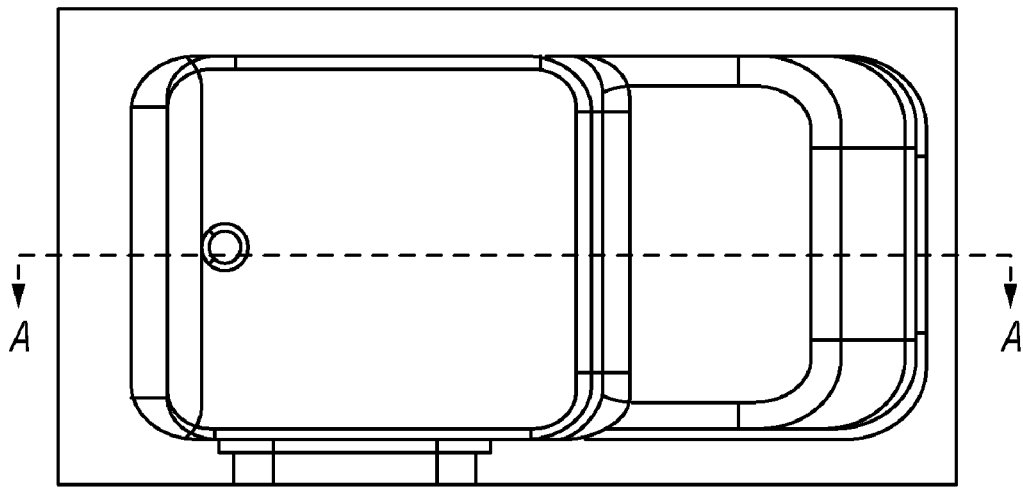
FIG. 25 is a top plan view of yet another embodiment of the walk-in bath tub.

FIG. 25 is a top plan view of yet another embodiment of the walk-in bath tub. This tub variation has a shallower depth and slightly greater length than the embodiments depicted in FIGS. 21-24.

Figure 26:
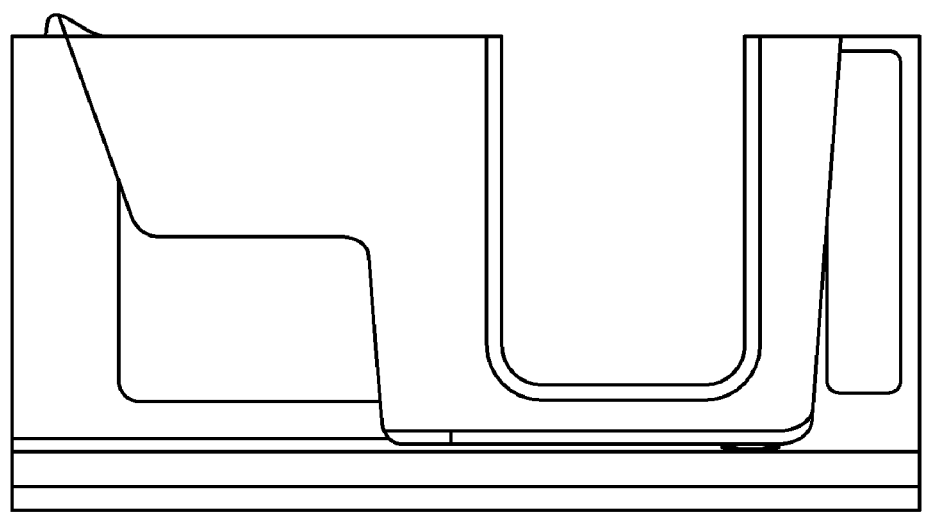
FIG. 26 is a cut away side view of the walk-in bathtub depicted in FIG. 25.

FIG. 26 is a cut away side view of the walk-in bathtub depicted in FIG. 25.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A method for manufacturing a walk-in bathtub, the method comprising the steps of:
   (a) heating an acrylic sheet, wherein the outer perimeter of the sheet is heated to a higher temperature than the center of the sheet;
   (b) placing the heated acrylic sheet over a vacuum mold, wherein the mold is shaped like a bathtub, including a seat and a foot well;
   (c) drawing the heated acrylic sheet into the mold using the vacuum, wherein vacuum pressure is manually reduced when the acrylic sheet reaches the top of the seat in the mold, and wherein the vacuum is shut off before the acrylic sheet reaches the bottom of the foot well of the mold;
   (d) cooling the acrylic and removing the acrylic sheet thereby forming a molded acrylic tub including a seat and a foot well tub from the mold;
   (e) securing the molded acrylic tub to a support frame;
   (f) cutting a door space in one side of the molded acrylic tub, wherein the door space allows a person to step into the foot well of the tub from the side without having to step over the walls of the tub.

2. The method according to claim 1, further comprising:
   (g) installing a pre-hung door assembly in said door space, wherein the door assembly comprises a door mounted onto a frame.

3. The method according to claim 1, wherein step (a) further comprises heating the outer perimeter of the acrylic sheet to approximately 370° F. and heating the center of the acrylic sheet to approximately 310° F.

4. The method according to claim 1, wherein step (c) further comprises spraying the mold with a mold release agent before drawing the acrylic sheet into the mold with the vacuum.

5. The method according to claim 1, wherein vacuum pressure is initiated at approximately 25 inches mercury.

6. The method according to claim 1, wherein the vacuum is shut off in step (c) when the acrylic is approximately two inches from the bottom of the foot well of the mold.

7. The method according to claim 1, wherein step (e) further comprises attaching an acrylic apron to the side of the frame, wherein the apron has a cut-out door section with a threshold that fills a gap between the apron and the door space cut out in one side of the tub in step (f).

8. The method according to claim 7, wherein the threshold is up to two and a half inches deep.

9. The method according to claim 1, wherein step (c) further comprises pulling part of the acrylic sheet over the outside surface of one side of the mold, forming a side apron that is integral with the molded tub.

10. The method according to claim 1, wherein step (d) further comprises reinforcing the underside of the molded acrylic tub with fiberglass.

11. The method according to claim 10, further comprising reinforcing the underside of the seat and foot well with wood panels that are secured by the fiberglass.

12. The method according to claim 1, wherein a corner between the floor and the side walls of the foot well has a radius of three inches.

13. The method according to claim 1, wherein the bottom of the foot well is up to 17 inches below the seat.

14. The method according to claim 1, wherein the foot well is up to 33 inches deep.

15. The method according to claim 1, wherein the support frame has a cut-out section in a bottom beam that allows access for plumbing installation.

16. The method according to claim 1, wherein the support frame further comprises adjustable leveling feet that allow reverse plumbing which comprises running the faucets under the tub when the door needs to be on a particular side and the plumbing is on the opposite side.

17. The method according to claim 1, wherein the support frame further comprises adjustable leveling feet that allow the bathtub to be dropped closer to the ground, if bathtub plumbing can be recessed into the ground, thereby lowering the threshold of the walk-in door.

* * * * *